(12) United States Patent
Ikeda et al.

(10) Patent No.: US 12,067,311 B2
(45) Date of Patent: Aug. 20, 2024

(54) TERMINAL APPARATUS, DISPLAY CONTROL METHOD, AND PROGRAM TO DISPLAY SCREEN DIFFERENT FROM ANOTHER SCREEN WHEN DISTANCE TO ELECTRONIC INSTRUMENT IS NOT GREATER THAN OR EQUAL TO THRESHOLD

(71) Applicant: SEIKO EPSON CORPORATION, Tokyo (JP)

(72) Inventors: Iwane Ikeda, Nagano (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/334,711

(22) Filed: Jun. 14, 2023

(65) Prior Publication Data

US 2023/0409257 A1 Dec. 21, 2023

(30) Foreign Application Priority Data

Jun. 17, 2022 (JP) .................................. 2022-097769

(51) Int. Cl.
*G06F 3/12* (2006.01)
(52) U.S. Cl.
CPC .......... *G06F 3/1226* (2013.01); *G06F 3/1203* (2013.01); *G06F 3/1292* (2013.01)
(58) Field of Classification Search
None
See application file for complete search history.

(56) References Cited

U.S. PATENT DOCUMENTS

| | | | |
|---|---|---|---|
| 2008/0256486 A1* | 10/2008 | Hagiwara | G06T 11/206 715/810 |
| 2014/0211252 A1* | 7/2014 | Tsujimoto | G06K 15/007 358/1.15 |
| 2015/0154482 A1* | 6/2015 | Kawai | G06F 3/1204 358/1.15 |

(Continued)

FOREIGN PATENT DOCUMENTS

JP 2021-029012 A 2/2021

*Primary Examiner* — Henok Shiferaw
(74) *Attorney, Agent, or Firm* — WORKMAN NYDEGGER

(57) ABSTRACT

A distance information acquisition section acquires distance information representing the distance between a terminal apparatus and an electronic instrument through short-range wireless communication with the electronic instrument. A direction information acquisition section acquires first direction information representing the direction toward the electronic instrument with respect to the terminal apparatus through the short-range wireless communication with the electronic instrument. When the distance to the electronic instrument based on the distance information is greater than or equal to a threshold, the display controller causes a display to display a first screen containing a direction display that displays the direction toward the electronic instrument with respect to the terminal apparatus based on the acquired first direction information. On the other hand, when the distance to the electronic instrument is not greater than or equal to the threshold, the display controller causes the display to display a second screen different from the first screen.

10 Claims, 16 Drawing Sheets

(56) References Cited

U.S. PATENT DOCUMENTS

| | | | |
|---|---|---|---|
| 2016/0205269 A1* | 7/2016 | Fujiwara | H04N 1/0044 358/1.2 |
| 2016/0253137 A1* | 9/2016 | Nakao | G06F 3/1259 358/1.14 |
| 2021/0044706 A1 | 2/2021 | Ito | |
| 2021/0132876 A1* | 5/2021 | Komatsu | H04M 1/72409 |

* cited by examiner

| MODEL | PREDETERMINED ANGULAR RANGE |
|---|---|
| MODEL A | $\theta a1 \sim \theta a2$ |
| MODEL B | $\theta b1 \sim \theta b2$ |
| MODEL C | $\theta c1 \sim \theta c2$ |
| MODEL D | $\theta d1 \sim \theta d2$ |
| MODEL E | $\theta e1 \sim \theta e2$ |

TERMINAL APPARATUS, DISPLAY CONTROL METHOD, AND PROGRAM TO DISPLAY SCREEN DIFFERENT FROM ANOTHER SCREEN WHEN DISTANCE TO ELECTRONIC INSTRUMENT IS NOT GREATER THAN OR EQUAL TO THRESHOLD

The present application is based on, and claims priority from JP Application Serial Number 2022-097769, filed Jun. 17, 2022, the disclosure of which is hereby incorporated by reference herein in its entirety.

BACKGROUND

1. Technical Field

The present disclosure relates to a terminal apparatus, a display control method, and a program.

2. Related Art

JP-A-2021-29012 discloses a terminal that performs Bluetooth (registered trademark) communication with an image processing apparatus. The terminal described in JP-A-2021-29012 receives a Bluetooth packet transmitted from the image processing apparatus, senses the direction toward the position where the image processing apparatus is located based on the received packet, and displays the sensed direction toward the position where the image processing apparatus is located on a display section.

The technology described in JP-A-2021-29012 senses the direction toward an antenna of the image processing apparatus and displays the direction toward the antenna of the image processing apparatus on the display section. Therefore, when a user holding the terminal approaches the image processing apparatus in such a way that the distance therebetween is smaller than or equal to a predetermined distance, the direction displayed on the display section may deviate from the direction toward a desired position (direction toward center of image processing apparatus, position of operation panel of image processing apparatus, or any other position on image processing apparatus). The technology described in JP-A-2021-29012 may therefore cause loss of convenience of the user.

SUMMARY

A terminal apparatus according to an aspect of the present disclosure includes a distance information acquisition section that acquires distance information representing a distance between the terminal apparatus and an electronic instrument through short-range wireless communication with the electronic instrument, a direction information acquisition section that acquires first direction information representing a direction toward the electronic instrument with respect to the terminal apparatus through the short-range wireless communication with the electronic instrument, and a display control section that controls a display on a display section. When the distance to the electronic instrument based on the distance information is greater than or equal to a threshold specified in advance, the display control section causes the display section to display a first screen containing a direction display that displays the direction toward the electronic instrument with respect to the terminal apparatus based on the acquired first direction information, and when the distance to the electronic instrument is not greater than or equal to the threshold, the display control section causes the display section to display a second screen different from the first screen.

A display control method according to another aspect of the present disclosure includes acquiring distance information representing a distance between a terminal apparatus and an electronic instrument through short-range wireless communication with the electronic instrument, acquiring first direction information representing a direction toward the electronic instrument with respect to the terminal apparatus through the short-range wireless communication with the electronic instrument, causing a display section of the terminal apparatus to display a first screen containing a direction display that displays the direction toward the electronic instrument with respect to the terminal apparatus based on the acquired first direction information when the distance to the electronic instrument based on the distance information is greater than or equal to a threshold specified in advance, and causing the display section to display a second screen different from the first screen when the distance to the electronic instrument is not greater than or equal to the threshold.

A program according to another aspect of the present disclosure causes a computer to acquire distance information representing a distance between a terminal apparatus and an electronic instrument through short-range wireless communication with the electronic instrument, acquire first direction information representing a direction toward the electronic instrument with respect to the terminal apparatus through the short-range wireless communication with the electronic instrument, cause a display section of the terminal apparatus to display a first screen containing a direction display that displays the direction toward the electronic instrument with respect to the terminal apparatus based on the acquired first direction information when the distance to the electronic instrument based on the distance information is greater than or equal to a threshold specified in advance, and cause the display section to display a second screen different from the first screen when the distance to the electronic instrument is not greater than or equal to the threshold.

DESCRIPTION OF EXEMPLARY EMBODIMENTS

First Embodiment

Figure 1:
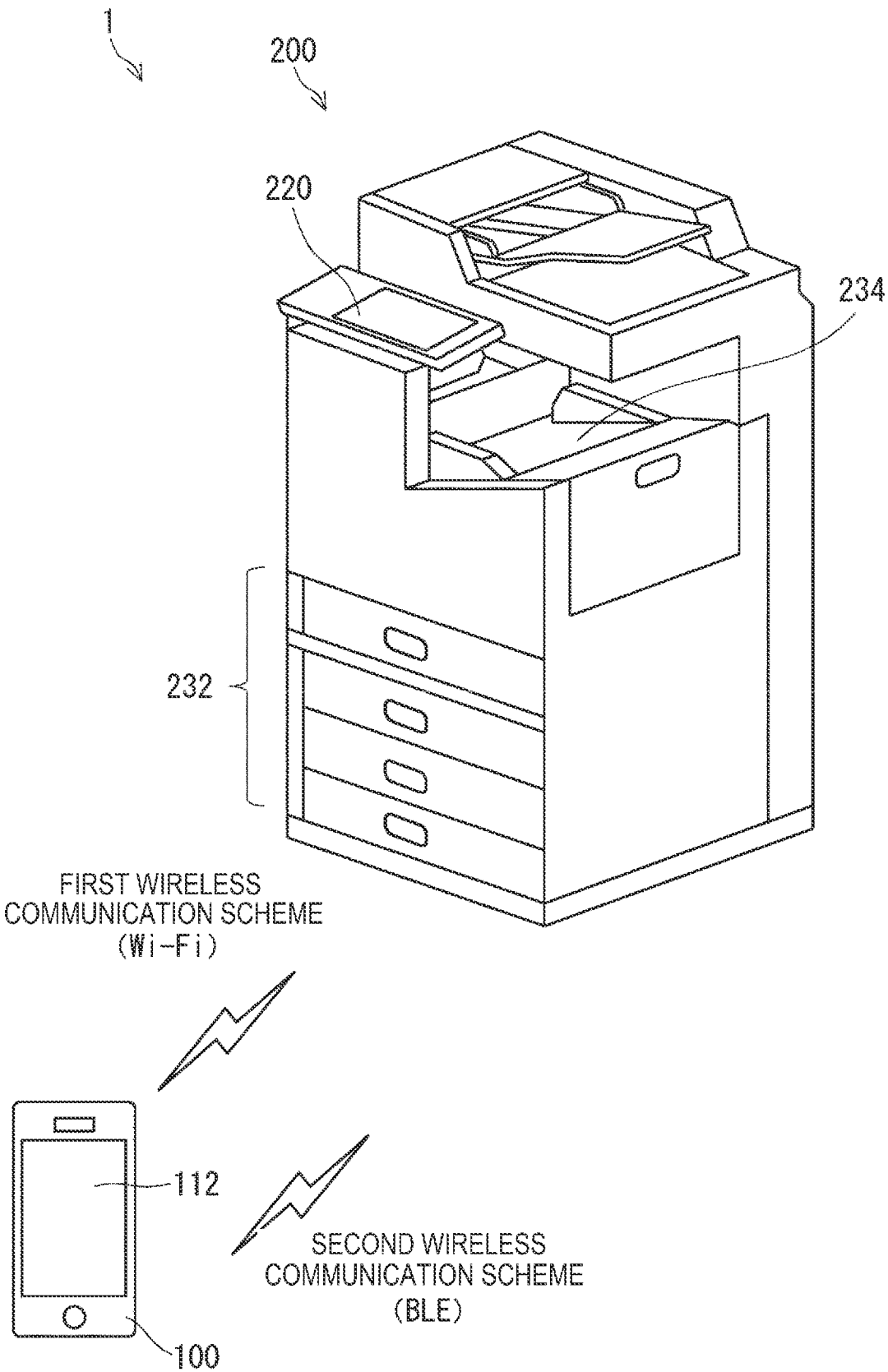
FIG. 1 shows a communication system according to a first embodiment.

An embodiment will be described below with reference to the drawings. For clarity of the description, omission and simplification are made as appropriate in the following description and drawings. In the drawings, the same element has the same reference character, and no duplicate description of the same element is made when necessary.

Figure 2:
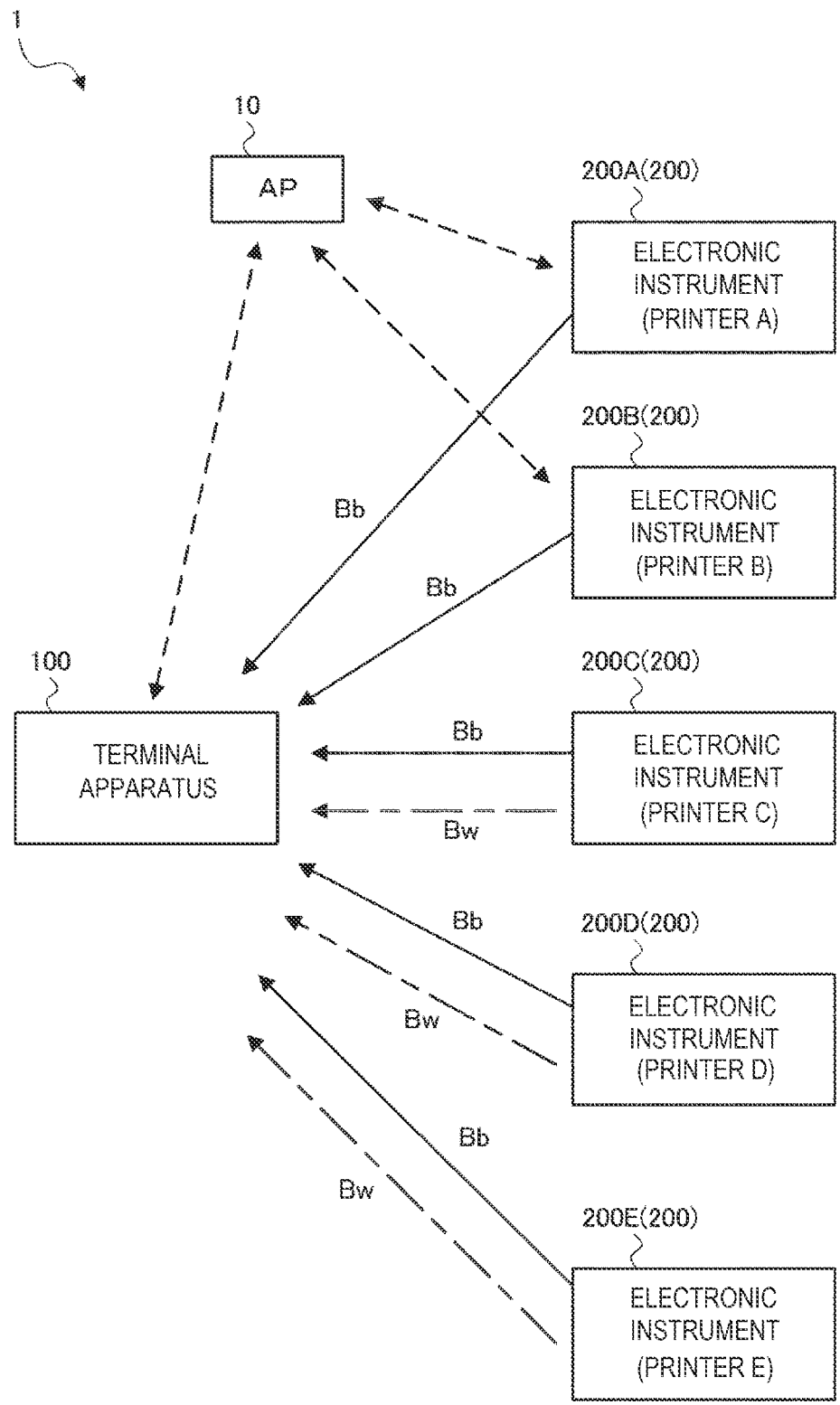
FIG. 2 shows the communication system according to the first embodiment.

FIGS. 1 and 2 show a communication system 1 according to a first embodiment. FIG. 1 diagrammatically show the communication system 1 according to the first embodiment. The communication system 1 includes a terminal apparatus 100 and an electronic instrument 200.

The terminal apparatus 100 is a portable terminal apparatus such as a smartphone or a tablet terminal. The terminal apparatus 100 may instead be a computer apparatus such as a personal computer (PC). The terminal apparatus 100 includes at least a display section 112. Other components of the terminal apparatus 100 will be described later.

The electronic instrument 200 is, for example, a printer. The electronic instrument 200 may instead, for example, be a multifunction peripheral instrument (MFP), a projector apparatus, or a scanner. A multifunction peripheral instrument having a printing function is also an example of the printer. The first embodiment will be described with reference to a case where the electronic instrument 200 is, for example, a printer such as a multifunction peripheral instrument.

The electronic instrument 200, which is a printer, includes at least an operation panel 220, a paper feed tray 232, and a paper discharge tray 234. The operation panel 220 is, for example, a touch panel into which a display device and an input device are integrated with each other. The paper feed tray 232 stores sheets of paper, which are each a print medium, for example, on a sheet size basis. Sheets of paper on which images have been formed are discharged into the paper discharge tray 234. Other components of the electronic instrument 200 will be described later.

The terminal apparatus 100 and the electronic instrument 200 communicate with each other over wireless communication using a first wireless communication scheme and wireless communication using a second wireless communication scheme. The first wireless communication scheme is a standard that provides a faster communication speed and a longer communicable distance than the second wireless communication scheme. The first wireless communication scheme is a wireless LAN (local area network) in a narrow sense, and more specifically Wi-Fi (registered trademark). The case where the first wireless communication scheme is Wi-Fi will be described below, but the first wireless communication scheme may be replaced with any other communication scheme.

The second wireless communication scheme is a standard that provides a slower communication speed and a shorter communicable distance than the first wireless communication scheme. The second wireless communication scheme is therefore a standard for achieving short-range wireless communication. The second wireless communication scheme is a standard that allows beacon signal transmission. The second wireless communication scheme is Bluetooth in a narrow sense, and more specifically BLE (Bluetooth Low Energy). The case where the second wireless communication scheme is BLE will be described below, but the second wireless communication scheme may be replaced with any other communication scheme. The BLE beacon signal corresponds to an advertisement packet. The first wireless communication scheme may also allow beacon signal transmission. When the first wireless communication scheme is Wi-Fi, the electronic instrument 200 may transmit a beacon signal that informs peripheral instruments of an SSID (service set identifier) of the electronic instrument 200.

FIG. 2 shows an example of the communication system 1 including a plurality of electronic instruments 200. The communication system 1 shown by way of example in FIG. 2 includes five electronic instruments 200A to 200E, the terminal apparatus 100, and an access point 10. The access point 10 is, for example, a wireless LAN access point. In the following description, the electronic instruments 200A to 200E may be referred to as printers A to E, respectively.

The electronic instruments 200 each transmit (broadcast) a BLE beacon Bb corresponding to the second wireless communication scheme. The BLE beacon Bb is a beacon signal that complies with the BLE standard. The terminal apparatus 100 receives a BLE beacon Bb and can search for the corresponding electronic instrument 200. Furthermore, the terminal apparatus 100 receives a BLE beacon Bb and can acquire distance information representing the distance from the terminal apparatus 100 to the corresponding electronic instrument 200. When the terminal apparatus 100 and the electronic instruments 200 support the Bluetooth 5.1 standard and later, the terminal apparatus 100 receives a BLE beacon Bb and can acquire first direction information representing the direction toward the corresponding electronic instrument 200 with respect to the terminal apparatus 100. The actions described above will be described later in detail.

The electronic instruments 200A and 200B can be connected to the terminal apparatus 100 via the access point 10. When the two electronic instruments 200 operate in an infrastructure mode and is connected to the access point the wireless communication between the terminal apparatus 100 and the electronic instruments 200 is performed by the terminal apparatus 100 that establishes wireless connection to the access point 10. The connection described above is referred to as infrastructure connection.

On the other hand, the electronic instruments 200C to 200E can be directly connected to the terminal apparatus 100 via no access point 10. In this process, the three electronic instruments 200 each activate an internal access point, and the terminal apparatus 100 connects to the internal access point, so that the communication between the terminal apparatus 100 and the three electronic instruments 200 is directly performed. The connection described above is referred to as direct connection. The direct connection between the terminal apparatus 100 and any of the three electronic instruments 200 may be established over communication compliant with the WFD (Wi-Fi direct) standard, or by using a Wi-Fi ad hoc mode.

The electronic instruments 200C to 200E each transmit (broadcast) a Wi-Fi beacon Bw containing an SSID. The Wi-Fi beacon Bw is a beacon signal that complies with the Wi-Fi standard. When the terminal apparatus 100 receives a Wi-Fi beacon Bw, the SSID contained in the Wi-Fi beacon Bw is displayed. At this point of time, the SSID and a password for connection are displayed on the operation panel 220 of the corresponding one of the electronic instruments 200C to 200E. A user of the terminal apparatus 100 sets the SSID and the password, which are displayed on the operation panel 220, in the terminal apparatus 100 operated by the user, so that the terminal apparatus 100 is directly connected to the corresponding one of the electronic instruments 200C to 200E.

Figure 3:
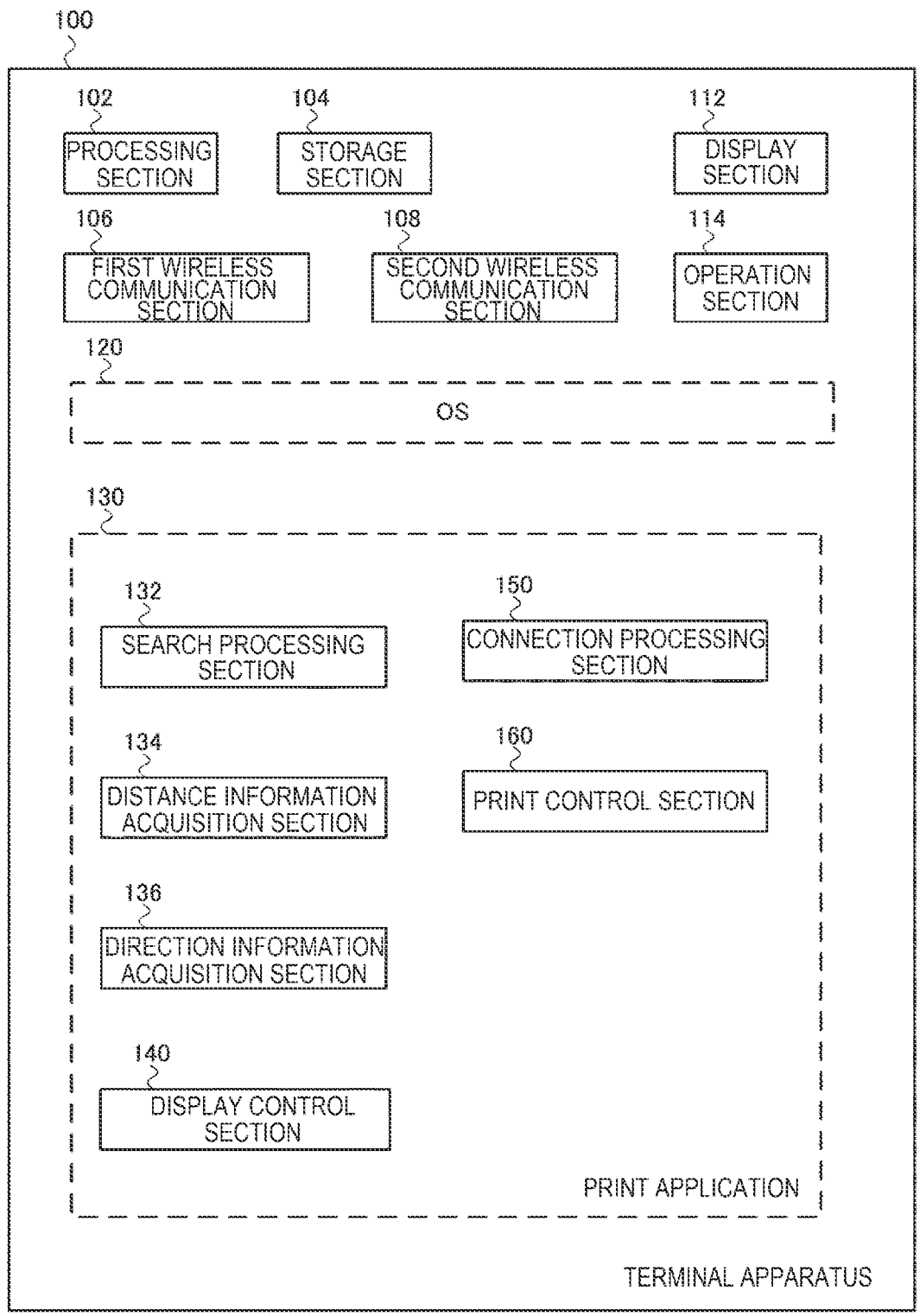
FIG. 3 shows the configuration of a terminal apparatus according to the first embodiment.

FIG. 3 shows the configuration of the terminal apparatus 100 according to the first embodiment. The terminal apparatus 100 includes as a primary hardware configuration a processing section 102, a storage section 104, a first wireless communication section 106, a second wireless communication section 108, a display section 112, and an operation section 114. The processing section 102, the storage section 104, the first wireless communication section 106, the second wireless communication section 108, the display section 112, and the operation section 114 may be interconnected to each other, for example, via a data bus.

The processing section 102 is, for example, a CPU (central processing unit) or any other processor. The processing section 102 may include a plurality of processors. The processing section 102 functions as an arithmetic operation apparatus that carries out a control process, an arithmetic operation process, and other processes. The processing section 102 controls the storage section 104, the first wireless communication section 106, the second wireless communication section 108, the display section 112, and the operation section 114.

The storage section 104 is a storage device, for example, a memory or a hard disk drive. The storage section 104 is, for example, a ROM (read only memory) or a RAM (random access memory). The storage section 104 has the function of storing a control program, an arithmetic operation program, and other programs executed by the processing section 102. The storage section 104 further has the function of temporarily storing processed data and other data. The storage section 104 can include a database.

The first wireless communication section 106 is a wireless communication device that performs wireless communication compliant with the first wireless communication scheme. The first wireless communication section 106, for example, performs wireless communication compliant with the Wi-Fi standard. The second wireless communication section 108 is a wireless communication device that performs wireless communication compliant with the second wireless communication scheme. The second wireless communication section 108, for example, performs wireless communication compliant with the BLE standard.

The display section 112 and the operation section 114 form a user interface. The display section 112 is formed, for example, of a monitor that displays a variety of pieces of information to the user. The operation section 114 is formed, for example, of buttons that accept the user's input operation. The display section 112 and the operation section 114 may be integrated with each other into a touch panel or any other component.

The terminal apparatus 100 has as a software configuration an OS 120 (operating system), which is basic software, and a print application 130. The print application 130 is application software that operates by using the functions of the OS 120. The print application 130 has as components a search processing section 132, a distance information acquisition section 134, a direction information acquisition section 136, a display control section 140, a connection processing section 150, and a print control section 160.

The components described above can each be achieved, for example, by execution of a program under the control of the processing section 102. More specifically, each of the components of the print application 130 can be achieved by the processing section 102 through execution of a program stored in the storage section 104. Instead, necessary programs may be recorded on any nonvolatile recording medium and installed as required to achieve each of the components.

Each of the components is not necessarily achieved by software formed of a program and may instead be achieved, for example, by a combination of any of hardware, firmware, and software. Each of the components may still instead be achieved by using a user-programmable integrated circuit, such as a field-programmable gate array (FPGA) or a micro-computer. In this case, the integrated circuit may be used to achieve a program formed of the components described above.

The search processing section 132 carries out the process of searching for an electronic instrument 200 by using the first and second wireless communication schemes. The process will be described later in detail. The distance information acquisition section 134 acquires the distance information representing the distance between the terminal apparatus 100 and each of the electronic instruments 200 through the short-range wireless communication with the electronic instrument 200. The acquisition will be described later in detail. The direction information acquisition section 136 acquires the first direction information representing the direction toward each of the electronic instruments 200 with respect to the terminal apparatus 100 through the short-range wireless communication with the electronic instrument. The acquisition will be described later in detail.

The display control section 140 controls the display on the display section 112. Specifically, the display control section 140 performs the control in such a way that the display section 112 displays information on an electronic instrument 200 found by the search process carried out by the search processing section 132. When the distance to the electronic instrument 200 based on the distance information is greater than or equal to a threshold specified in advance, the display control section 140 causes the display section 112 to display a first screen containing a direction display that displays the direction toward the electronic instrument 200 with respect to the terminal apparatus 100 based on the acquired first direction information. On the other hand, when the distance to the electronic instrument 200 is not greater than or equal to the threshold, the display control section 140 causes the display section 112 to display a second screen different from the first screen.

The first screen may be a screen in which the direction display is displayed in a more noticeable form than in the second screen. The second screen may be a screen containing no direction display. The second screen may contain a message indicating that the distance to the electronic instrument 200 is smaller than the threshold.

The display control section 140 may acquire second direction information indicating the direction toward the terminal apparatus 100 with respect to the electronic instrument 200. In this case, the display control section 140 may cause the display section 112 to display the second screen when the distance to the electronic instrument 200 is not greater than or equal to the threshold and the direction toward the terminal apparatus 100 with respect to the electronic instrument 200 based on the second direction information falls within a predetermined angular range.

The connection processing section 150 carries out the process of connecting the terminal apparatus 100 to the electronic instrument 200 in a communicable manner. The process will be described later in detail. The print control section 160 controls the connected electronic instrument 200 (printer) to perform printing. The control will be described later in detail. When the print control section 160 accepts a print instruction issued by the user's operation, the print control section 160 performs the control in such a way that print data is transmitted to the connected electronic instrument 200. The print instruction contains the print data. The "print data" is data representing an image to be printed on a sheet of paper.

Figure 4:
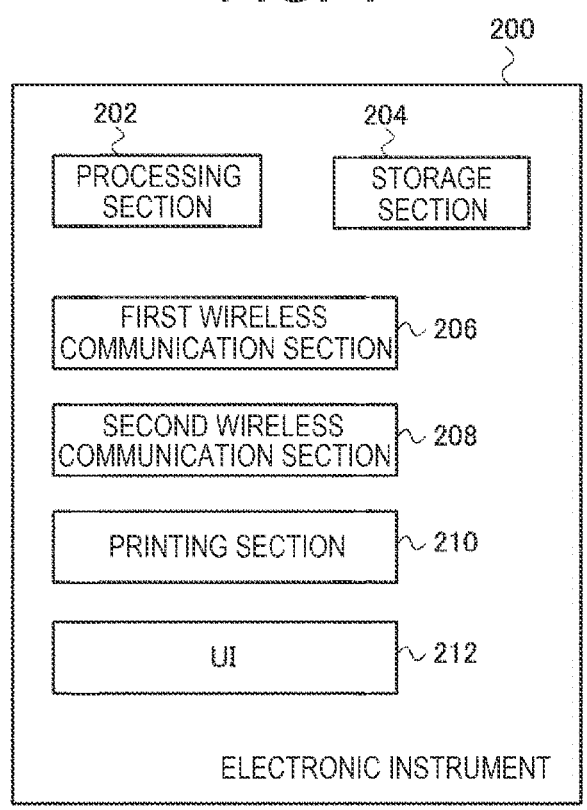
FIG. 4 shows the configuration of an electronic instrument according to the first embodiment.

FIG. 4 shows the configuration of each of the electronic instruments 200 according to the first embodiment. FIG. 4 shows the case where the electronic instrument 200 is a printer. The electronic instrument 200 includes a processing section 202, a storage section 204, a first wireless communication section 206, a second wireless communication section 208, a printing section 210, and a user interface (UI) 212. The processing section 202, the storage section 204, the first wireless communication section 206, the second wireless communication section 208, the printing section 210, and the user interface 212 may be interconnected to each other, for example, via a data bus.

The processing section 202 is a processor, for example, a CPU. The processing section 202 may include a plurality of processors. The processing section 202 functions as an arithmetic operation apparatus that carries out a control process, an arithmetic operation process, and other processes. The processing section 202 controls the storage section 204, the first wireless communication section 206, the second wireless communication section 208, the printing section 210, and the user interface 212.

The storage section 204 is a storage device, such as a memory or a hard disk drive. The storage section 204 is, for example, a ROM or a RAM. The storage section 204 has the function of storing a control program, an arithmetic operation program, and other programs executed by the processing section 202. The storage section 204 further has the function of temporarily storing processed data and other data. The storage section 204 can include a database.

The first wireless communication section 206 is a wireless communication device that performs wireless communication compliant with the first wireless communication scheme. The first wireless communication section 206, for example, performs wireless communication compliant with the Wi-Fi standard. The second wireless communication section 208 is a wireless communication device that performs wireless communication in compliant the second wireless communication scheme. The second wireless communication section 208, for example, performs wireless communication compliant with the BLE standard. The first wireless communication section 206 of each of the electronic instruments 200C to 200E may instead activate an internal access point in accordance with given connection settings. In this case, the first wireless communication section 206 accepts a connection request from the terminal apparatus 100. The connection settings are, for example, SSID and passphrase settings or communication frequency band settings. The communication frequency band settings correspond to channel settings.

The printing section 210 has a printing function of forming an image on a sheet of paper, that is, a print medium. The printing section 210 includes a print engine. The print engine is a mechanical configuration that prints an image on the print medium. The print engine may, for example, have a mechanism that performs toner-based printing in an electrophotographic scheme. The print engine may instead have, for example, a mechanism that performs inkjet printing. The print engine may have a transport mechanism that transports the print medium.

The user interface 212 includes an input apparatus such as buttons, a keyboard, a touch panel, or a mouse, and an output apparatus such as a monitor or a loudspeaker. The user interface 212 may be the input apparatus and the output apparatus integrated with each other into a unit. The user interface 212 accepts the user's operation of inputting data and outputs information to the user. The user interface 212 includes the operation panel 220 described above.

Figure 5:
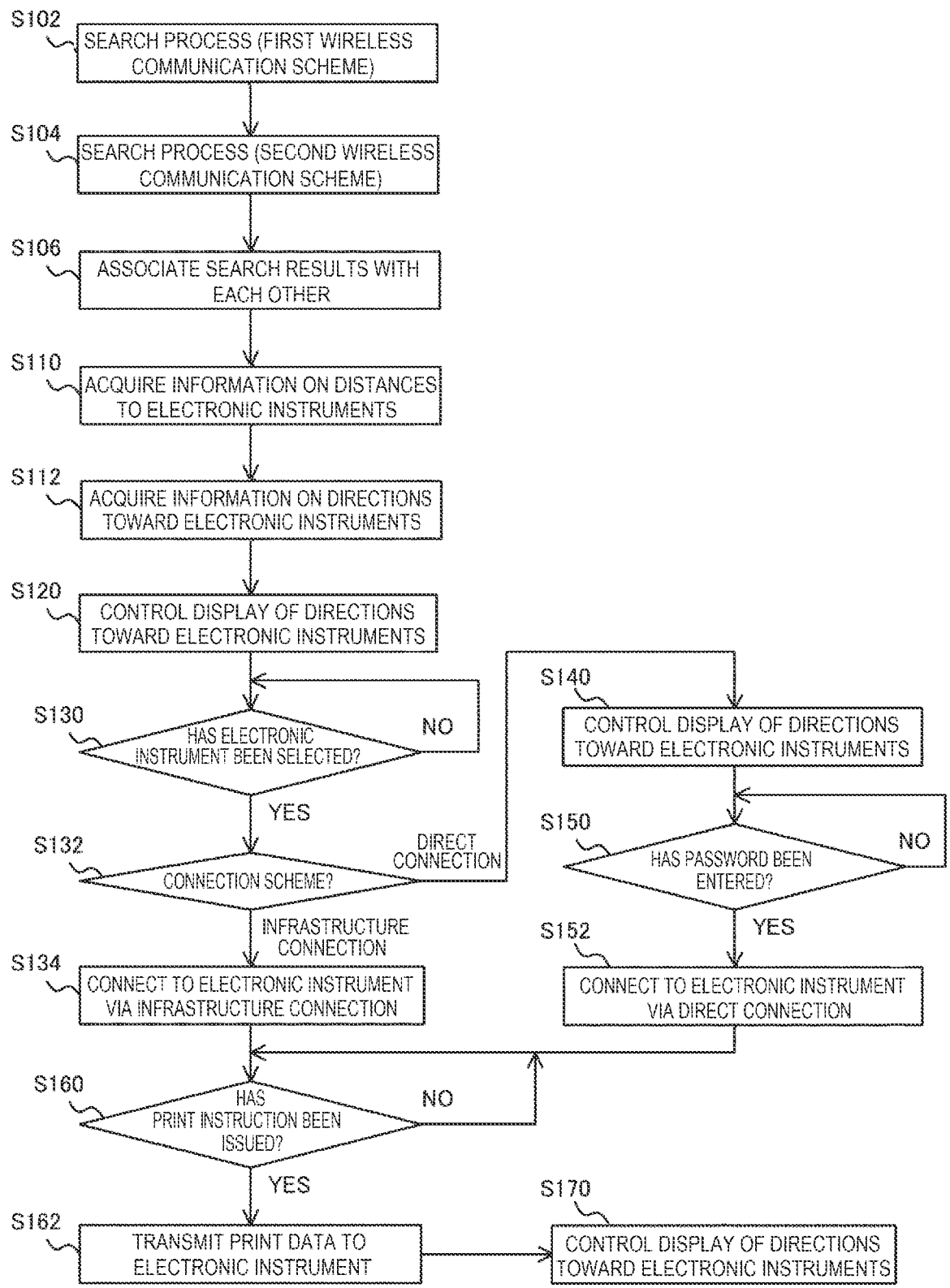
FIG. 5 is a flowchart showing processes carried out by the terminal apparatus according to the first embodiment.
Figure 6:
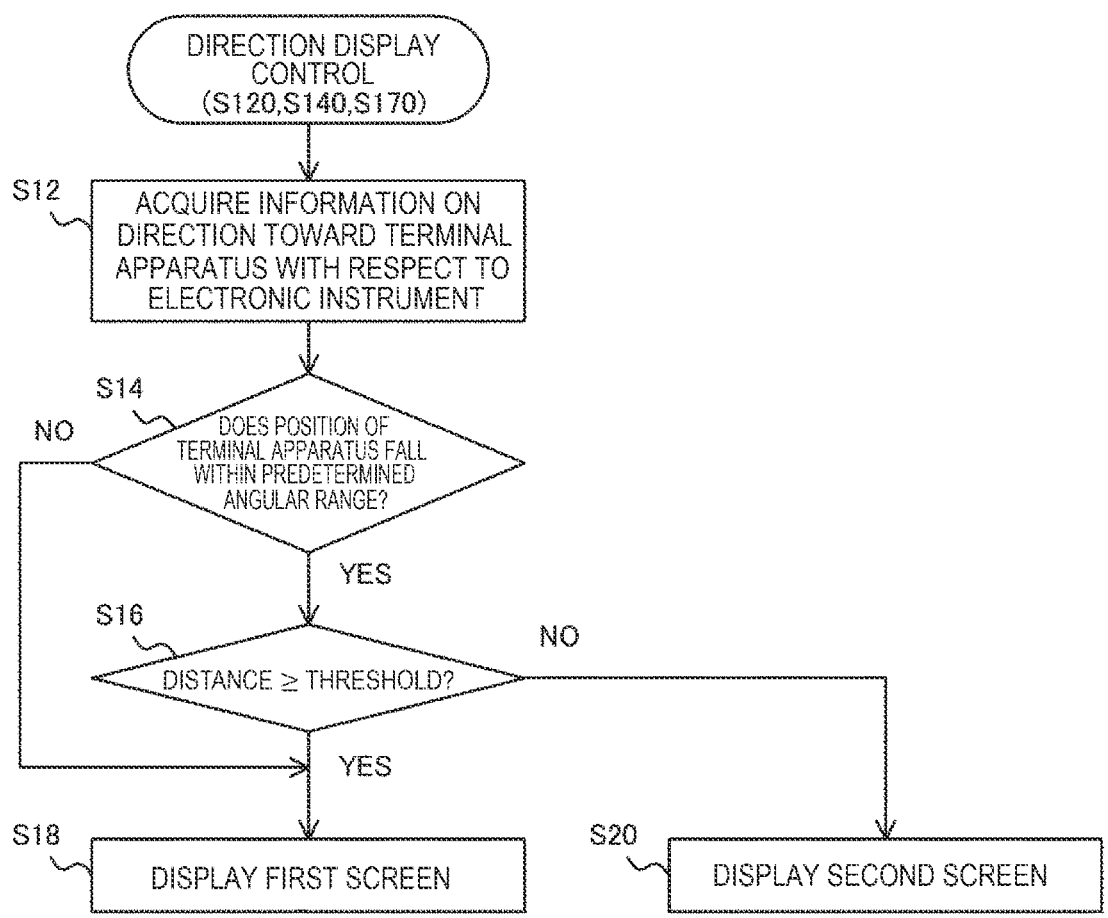
FIG. 6 is a flowchart showing processes carried out by the terminal apparatus according to the first embodiment.

FIGS. 5 and 6 are flowcharts showing processes carried out by the terminal apparatus 100 according to the first embodiment. Part of the flowchart shown in FIG. 5 and the flowchart shown in FIG. 6 correspond to a display control method executed by the terminal apparatus 100. The search processing section 132 performs the search process using the first wireless communication scheme (step S102). That is, the search processing section 132 searches for electronic instruments 200 that can be connected by using the first wireless communication scheme.

Specifically, the search processing section 132 searches for electronic instruments 200 capable of establishing the infrastructure connection as will be described below. In the example shown in FIG. 2, the search processing section 132 searches for the electronic instruments 200A and 200B as will be described below. That is, the search processing section 132 transmits a search request packet to the network established by the access point 10, to which the terminal apparatus 100 is connected. At this point of time, the electronic instruments 200A and 200B connected to the access point 10 each transmit a response packet in response to the search request packet. The search processing section 132 can search for electronic instruments 200 connected to the access point 10 based on the received response packets.

The search processing section 132 further searches for electronic instruments 200 capable of establishing the direct connection as will be described below. In the example shown in FIG. 2, the search processing section 132 searches for the electronic instruments 200C to 200E as will be described below. That is, the first wireless communication section 106 of the terminal apparatus 100 receives the Wi-Fi beacon Bw transmitted by each of the three electronic instruments 200. The search processing section 132 can search for electronic instruments 200 capable of establishing the direct connection based on the received Wi-Fi beacons Bw.

The search processing section 132 acquires search results indicating electronic instruments 200 found by the search. In this process, the search processing section 132 may acquire identification information and address information of the found electronic instruments 200 that are contained in the response packet or the Wi-Fi beacon Bw. The identification information is, for example, but not limited to, the serial numbers of the electronic instruments 200. The identification information of an electronic instrument 200 that establishes the direct connection may be an SSID. The address information is an address unique to an electronic instrument 200. The address information is, for example, but not limited to, the media access control (MAC) address.

The search processing section 132 carries out the search process using the second wireless communication scheme (step S104). Specifically, the second wireless communication section 108 of the terminal apparatus 100 receives the BLE beacon Bb transmitted by each of the electronic instruments 200. The search processing section 132 can search for electronic instruments 200 based on the received BLE beacons Bb. The search processing section 132 acquires search results indicating electronic instruments 200 found by the search. In this process, the search processing section 132 may acquire identification information and address information of the electronic instruments 200 that are contained in the BLE beacons Bb.

The search processing section 132 carries out the process of associating the search results with each other (step S106). Specifically, the search processing section 132 associates the result of the search using the first wireless communication scheme in S102 with the result of the search using the second wireless communication scheme in S104 based on the address information of the electronic instruments 200 found by the search. At this point of time, the display control section 140 may cause the display section 112 to display the associated search results. That is, the display control section 140 may cause the display section 112 to display information on the electronic instruments 200 found by the search. Furthermore, the display control section 140 may cause the display section 112 to display a device list that is a list of the information on electronic instruments 200 found by the search.

More specifically, the search processing section 132 compares the address information contained in the results of the search using the first wireless communication scheme with the address information contained in the results of the search using the second wireless communication scheme. As a result of the comparison, the search processing section 132 associates the address information search results that coincide with each other as the result of the search for the same electronic instrument 200. The result of the search using the first wireless communication scheme indicates electronic instruments 200 connectable by using the first wireless communication scheme, such as Wi-Fi. On the other hand, the BLE beacon Bb used in the search using the second wireless communication scheme can contain additional information that is not acquired by the response packet and the Wi-Fi beacon Bw used in the search process using the first wireless communication scheme. Associating the search results with each other can therefore indicate the additional information on the electronic instruments 200 connectable by using the first wireless communication scheme, such as Wi-Fi.

The additional information is, for example, status information representing the state of an electronic instrument 200. The status information can indicate, for example, whether the electronic instrument 200 is in an operating, idle, or error state. The operating state is a state in which the electronic instrument 200 is executing a job, such as printing, by using the functions thereof. The idle state is a state in which the electronic instrument 200 is not executing any job and is waiting for job submission. The error state is a state in which some error has occurred in the electronic instrument 200 and the electronic instrument 200 is unable to execute a job. For example, when the electronic instrument 200 is a printer, the error state is a state in which the printer experiences lack of ink/toner, lack of sheets of paper or any other print medium, a jammed print medium, or component failure. The operating state is a state that does not allow a new job to be immediately executed. The idle state is a state that allows a new job to be immediately executed. The error state is a state that requires the user's action to execute a job.

The distance information acquisition section 134 acquires information on the distances to the found electronic instruments 200 through the short-range wireless communication such as BLE or Bluetooth (step S110). Specifically, the distance information acquisition section 134 acquires radio wave intensity information representing the radio wave intensity of each of the received BLE beacons Bb. The radio wave strength information can correspond to a received radio wave intensity or a received signal intensity. The distance information acquisition section 134 uses the radio wave intensity information to estimate the distance between the terminal apparatus 100 and the electronic instrument 200.

That is, the greater the radio wave intensity of the BLE beacon Bb, the smaller the distance between the electronic instrument 200 having transmitted the BLE beacon Bb and the terminal apparatus 100. Conversely, the smaller the radio wave intensity of the BLE beacon Bb, the greater the distance between the electronic instrument 200 having transmitted the BLE beacon Bb and the terminal apparatus 100. For example, in the case of iBeacon (registered trademark), which is one of the BLE standards, the location from which the beacon signal is issued can be selected from the following three locations: "Immediate"; "Near"; and "Far". For example, "Immediate" corresponds to a distance of about a few centimeters, "Near" corresponds to about a few meters, and "Far" corresponds to about 10 meters. The distance information acquisition section 134 thus acquires the distance information representing the distance between the terminal apparatus 100 and any of the electronic instruments 200.

The distance information acquiring section 134 may instead calculate the distance between the electronic instrument 200 having transmitted the BLE beacon Bb and the terminal apparatus 100 based on the radio wave intensity of the BLE beacon Bb. In general, it is known that the radio wave intensity weakens in inversely proportional to the square of the distance. Therefore, when the radio wave intensity at a reference distance is known, the distance between the terminal apparatus 100 and the electronic instrument 200 can be calculated based on the radio wave intensity of the actually received BLE beacon Bb. In this case, it is assumed that the BLE beacon Bb contains reference radio wave intensity information. The distance information acquisition section 134 then calculates the distance between the terminal apparatus 100 and the electronic instrument 200 based on the reference radio wave intensity information and the radio wave intensity information. The distance information acquisition section 134 thus acquires the distance information representing the distance between the terminal apparatus 100 and the electronic instrument 200.

The direction information acquisition section 136 acquires information on the direction toward each of the electronic instruments 200 found through the short-range wireless communication, such as BLE or Bluetooth (step S112). Specifically, the direction information acquisition section 136 acquires the first direction information representing the direction toward the electronic instrument 200 with respect to the terminal apparatus 100 by using a direction sensing function specified in the Bluetooth 5.1 standard and later. More specifically, the direction information acquisition section 136 calculates the angle of reception, that is, the angle of arrival (AoA) of the radio wave, at the terminal apparatus 100, of the BLE beacon Bb transmitted from the electronic instrument 200. The angle of arrival AoA can be calculated in accordance with the AoA scheme described in JP-A-2021-29012. That is, the terminal apparatus 100 includes a plurality of antennas. The terminal apparatus 100 receives radio waves, that is, the BLE beacons Bb, via the plurality of antennas. The direction information acquisition section 136 of the terminal apparatus 100 calculates the angle of arrival AoA, which is an angle with respect to the direction in which the plurality of antennas are arranged, based on the distance between the plurality of antennas and the difference in phase between the radio waves received by the plurality of antennas.

The processes in S110 and S112 may be carried out at later timings as appropriate. For example, the electronic instruments 200 may each transmit the BLE beacon Bb whenever a predetermined period elapses. In this case, the terminal apparatus 100 may carry out the processes in S110 and S112 whenever the terminal apparatus 100 receives a BLE beacon Bb. Instead, the terminal apparatus 100 may carry out the processes in S110 and S112 before carrying out the processes in S120, S140, and S170, which will be described later.

Similarly, the processes in S102 to S106 may be carried out at later timings as appropriate. For example, the electronic instruments 200 may each transmit the Wi-Fi beacon Bw whenever a predetermined period elapses. In this case, the terminal apparatus 100 may carry out the process in S102 whenever the terminal apparatus 100 receives a Wi-Fi beacon Bw. When the terminal apparatus 100 transmits the search request packet whenever a predetermined period elapses, the terminal apparatus 100 may carry out the process in S102 whenever the terminal apparatus 100 receives a response packet. The terminal apparatus 100 may carry out the process in S104 whenever the terminal apparatus 100 receives a BLE beacon Bb. The terminal apparatus 100 may then carry out the process in S106 whenever the processes in S102 and S104 are carried out as described above.

The display control section 140 controls the display of the directions toward the found electronic instruments 200 (step S120). Specifically, when the position of an electronic instrument 200 satisfies a predetermined condition, the display control section 140 causes the display section 112 to display the first screen containing a direction display showing the direction toward the electronic instrument 200. The direction display corresponds to the first direction information acquired in the process in S112. On the other hand, when the position of the electronic instrument 200 does not satisfy the predetermined condition, the display control section 140 causes the display section 112 to display the second screen different from the first screen. The first and second screens will be described later. The content of the process in step S120 will be described later with reference to FIG. 6.

The connection processing section 150 evaluates whether an electronic instrument 200 that should execute a job, such as printing, has been selected (step S130). For example, the connection processing section 150 evaluates whether an electronic instrument 200 has been selected by the user's operation of selecting one electronic instrument 200 from the device list of the electronic instruments 200 displayed on the display section 112 under the control of the display control section 140. For example, when the user taps one of the electronic instruments in the device list of the electronic instruments 200 displayed on the display section 112, which is a touch panel, the tapped electronic instrument 200 is selected. When the electronic instrument 200 is not selected (NO in S130), the connection processing section 150 repeats the process in S130.

On the other hand, when an electronic instrument 200 is selected (YES in S130), the connection processing section 150 evaluates whether the connection scheme for the selected electronic instrument 200 is the infrastructure connection or the direct connection (step S132). The evaluation may be performed in accordance with the result of the process in S102, whether the selected electronic instrument 200 has been found by a response packet in response to the search request packet or by the Wi-Fi beacon Bw. In this case, when the selected electronic instrument 200 has been found by the response packet, the connection processing section 150 determines that the connection scheme for the selected electronic instrument 200 is the infrastructure connection. On the other hand, when the selected electronic instrument 200 has been found by the Wi-Fi beacon Bw, the connection processing section 150 determines that the connection scheme for the selected electronic instrument 200 is the direct connection.

Each BLE beacon Bb may include information representing the connection scheme for an electronic instrument 200 having transmitted the BLE beacon Bb. In this case, when the selected electronic instrument 200 has been found by a BLE beacon Bb in the process in S104, the connection processing section 150 may use information representing the connection scheme contained in the BLE beacon Bb to determine the connection scheme. The connection processing section 150 may instead determine that the connection scheme for the selected electronic instrument 200 is the direct connection when the information on the selected electronic instrument 200 contains a unique SSID. On the other hand, the connection processing section 150 may determine that the connection scheme for the selected electronic instrument 200 is the infrastructure connection when the information on the selected electronic instrument 200 contains an SSID relating to the access point 10.

When an electronic instrument 200 is selected, the display control section 140 may display the selected electronic instrument 200 in the device list in such a way that the selected electronic instrument 200 is distinguishable from the electronic instruments 200 that have not been selected. For example, the display control section 140 may display the selected electronic instrument 200 in the device list in a more noticeable form than the electronic instruments 200 that have not been selected.

When the connection scheme for the selected electronic instrument 200 is the infrastructure connection ("infrastructure connection" in S132), the connection processing section 150 carries out the process of connecting the terminal apparatus 100 to the electronic instrument 200 via the infrastructure connection (step S134). In this case, the connection processing section 150 carries out the process of connecting the terminal apparatus 100 to the electronic instrument 200 via the access point 10 as described above. In this process, the connection processing section 150 may control the first wireless communication section 106 in such a way that the terminal apparatus 100 is connected to the electronic instrument 200 by using the first wireless communication scheme.

On the other hand, when the connection scheme for the selected electronic instrument 200 is the direct connection ("direct connection" in S132), the display control section 140 controls the display of the direction toward the selected electronic instrument 200 (step S140). The process in S140 may be substantially the same as the process in S120 described above. The messages displayed on the first and second screens in the process in S140 may, however, differ from that in the process in S120. That is, the first and second screens displayed in the process in S140 may contain a message that prompts the user to enter the password displayed on the operation panel 220 of the electronic instrument 200 to the terminal apparatus 100. The control will be described later in detail.

The connection processing section 150 evaluates whether the password required for the direct connection has been entered into the terminal apparatus 100 (step S150). Specifically, the connection processing section 150 evaluates whether the password has been entered, for example, by the user's operation of the operation section 114. When no password has been entered (NO in S150), the connection processing section 150 repeats the process in S150.

On the other hand, when the password has been entered (YES in S150), the connection processing section 150 carries out the process of connecting the terminal apparatus 100 to the electronic instrument 200 via the direct connection (step S152). In this case, the connection processing section 150 carries out the process of connecting the terminal apparatus 100 directly to the electronic instrument 200 via no access point 10 as described above. In this process, the connection processing section 150 may control the first wireless communication section 106 in such a way that the terminal apparatus 100 is connected to the electronic instrument 200 by using the first wireless communication scheme.

The print control section 160 evaluates whether the print instruction has been issued (step S160). Specifically, the print control section 160 evaluates whether the print instruction has been accepted, for example, through the user's operation of the operation section 114. When no print instruction has been issued (NO in S160), the print control section 160 repeats the process in S160. On the other hand, when the print instruction has been issued (YES in S160), the print control section 160 transmits the print data contained in the print instruction to the electronic instrument 200 connected to the terminal apparatus 100 (step S162). The print control section 160 may control the first wireless communication section 106 to transmit the print data to the electronic instrument 200 by using the first wireless communication scheme. The electronic instrument 200, which is a printer, thus performs the printing to form an image corresponding to the print data on the print medium. The print media on which the image corresponding to the print data has been formed is discharged to the paper discharge tray 234, as described above.

The display control section 140 controls the display of the direction toward the selected electronic instrument 200 (step S170). The process in S170 may be substantially the same as the process in S120 described above. The messages displayed on the first and second screens in the process in S170 may, however, differ from that in the process in S120. That is, the first and second screens displayed in the process in S170 may contain a message indicating that the print data has been transmitted to the selected electronic instrument 200. The control will be described later in detail.

FIG. 6 shows an example of the contents of the processes in S120, S140, and S170 of the flowchart shown in FIG. 5. The display control section 140 acquires the second direction information indicating the direction toward the terminal apparatus 100 with respect to each of the found electronic instruments 200 (step S12). Specifically, the display control section 140 acquires the second direction information by using one of the following two methods along with the direction sensing function specified in the Bluetooth 5.1 standard and later.

As the first method, the display control section 140 detects the BLE beacon Bb transmitted from the electronic instrument 200, specifically, detects an angle of transmission, that is, an angle of departure (AoD) of the radio wave in the electronic instrument 200. The angle of departure AoD can be calculated in accordance with the AoD scheme described in JP-A-2021-29012. That is, the electronic instrument 200 includes a plurality of antennas. The electronic instrument 200 radiates radio waves, that is, the BLE beacons Bb via the plurality of antennas. The display control section 140 of the terminal apparatus 100 calculates the angle of departure AoD, which is an angle with respect to the direction in which the plurality of antennas are arranged, based on the distance between the plurality of antennas and the difference in phase between the radio waves transmitted via the plurality of antennas. It is assumed that the terminal apparatus 100 is notified in advance of information representing the distance between the plurality of antennas of the electronic instrument 200 and information representing the timing of transmission of the radio waves via the plurality of antennas. The two types of information may be contained in the BLE beacon Bb. The display control section 140 thus acquires the second direction information. That is, the display control section 140 acquires the second direction information detected by the terminal apparatus 100 and corresponding to the angle at which the electronic instrument 200 radiates a radio wave (angle of departure AoD).

As the second method, the electronic instrument 200 detects the BLE beacon or any other radio wave transmitted from the terminal apparatus 100, specifically, detects the angle of reception, that is, the angle of arrival AoA, at which the radio wave is received by the electronic instrument 200. That is, it is assumed in the second method that the terminal apparatus 100 radiates a radio wave such as a BLE beacon. The angle of arrival AoA can be calculated by the method described in JP-A-2021-29012. That is, the electronic instrument 200 includes a plurality of antennas. The electronic instrument 200 receives the radio waves with the plurality of antennas. The electronic instrument 200 calculates the angle of arrival AoA, which is an angle with respect to the direction in which the plurality of antennas are arranged, based on the distance between the plurality of antennas and the difference in phase between the radio waves received by the plurality of antennas. The electronic instrument 200 then transmits the second direction information representing the angle of arrival AoA to the terminal apparatus 100. The display control section 140 thus acquires the second direction information. That is, the display control section 140 acquires the second direction information detected by the electronic instrument 200 and corresponding to the angle at which the electronic instrument 200 radiates a radio wave.

The display control section 140 evaluates whether the position of the terminal apparatus 100 falls within the predetermined angular range (step S14). Specifically, the display control section 140 evaluates whether an electronic-instrument-side angle β indicated by the second direction information falls within the predetermined angular range. Note that the electronic-instrument-side angle β corresponds to the direction toward the terminal apparatus 100 with respect to the electronic instrument 200. That is, the display control section 140 evaluates whether the direction toward the terminal apparatus 100 with respect to the electronic instrument 200 based on the second direction information falls within the predetermined angular range. The predetermined angular range will be described later with reference to FIG. 7. The predetermined angular range can be a range containing a position corresponding to the front surface of the electronic instrument 200. The position corresponding to the front surface of the electronic instrument 200 can, for example, be a position where the user can operate the operation panel 220 of the electronic instrument 200.

When the position of the terminal apparatus 100 does not fall within the predetermined angular range, that is, the direction toward the terminal apparatus 100 with respect to the electronic instrument 200 does not fall within the predetermined angular range (NO in S14), the display control section 140 causes the display section 112 to display the first screen (step S18). The first screen is a screen containing the display of the direction toward the electronic instrument 200 with respect to the terminal apparatus 100, as described above. On the other hand, when the position of the terminal apparatus 100 falls within the predetermined angular range (YES in S14), the display control section 140 evaluates whether the distance between the terminal apparatus 100 and the electronic instrument 200 is greater than or equal to the threshold specified in advance (step S16). That is, when the direction toward the terminal apparatus 100 with respect to the electronic instrument 200 falls within the predetermined angular range, the display control section 140 evaluates whether the distance indicated in the distance information acquired in the process in S110 is greater than or equal to the threshold.

When the distance between the terminal apparatus 100 and the electronic instrument 200 is greater than or equal to the threshold (YES in S16), the display control section 140 causes the display section 112 to display the first screen (S18). On the other hand, when the distance between the terminal apparatus 100 and the electronic instrument 200 is not greater than or equal to the threshold (NO in S16), the display control section 140 causes the display section 112 to display the second screen (S20). The second screen may be a screen that does not contain the display of the direction toward the electronic instrument 200 with respect to the terminal apparatus 100, as described above. The second screen may be a screen containing a direction display that is less noticeable than that in the first screen. The second screen may contain a message corresponding to the fact that the distance to the electronic instrument 200 is smaller than the threshold. When the second screen contains the direction display, the message may be displayed with the message superimposed on the direction display in the second screen.

The evaluation performed in S14 and S16 corresponds to evaluation of whether the terminal apparatus 100 falls within a predetermined range at the side facing the front surface of the electronic instrument 200. That is, when the result of the evaluation in S14 is YES and the result of the evaluation in S16 is NO, the terminal apparatus 100 is determined to fall within the predetermined range at the side facing the front surface of the electronic instrument 200. That is, when the position of the terminal apparatus 100 falls within the predetermined angular range and the distance between the terminal apparatus 100 and the electronic instrument 200 is smaller than the threshold, the terminal apparatus 100 is determined to fall within the predetermined range at the side facing the front surface of the electronic instrument 200. Therefore, the second screen can be displayed on the display section 112 of the terminal apparatus 100 when the terminal apparatus 100 is determined to fall within the predetermined range at the side facing the front surface of the electronic instrument 200. On the other hand, the first screen can be displayed on the display section 112 of the terminal apparatus 100 when the terminal apparatus 100 is determined not to fall within the predetermined range at the side facing the front surface of the electronic instrument 200.

Figures 7, 8:
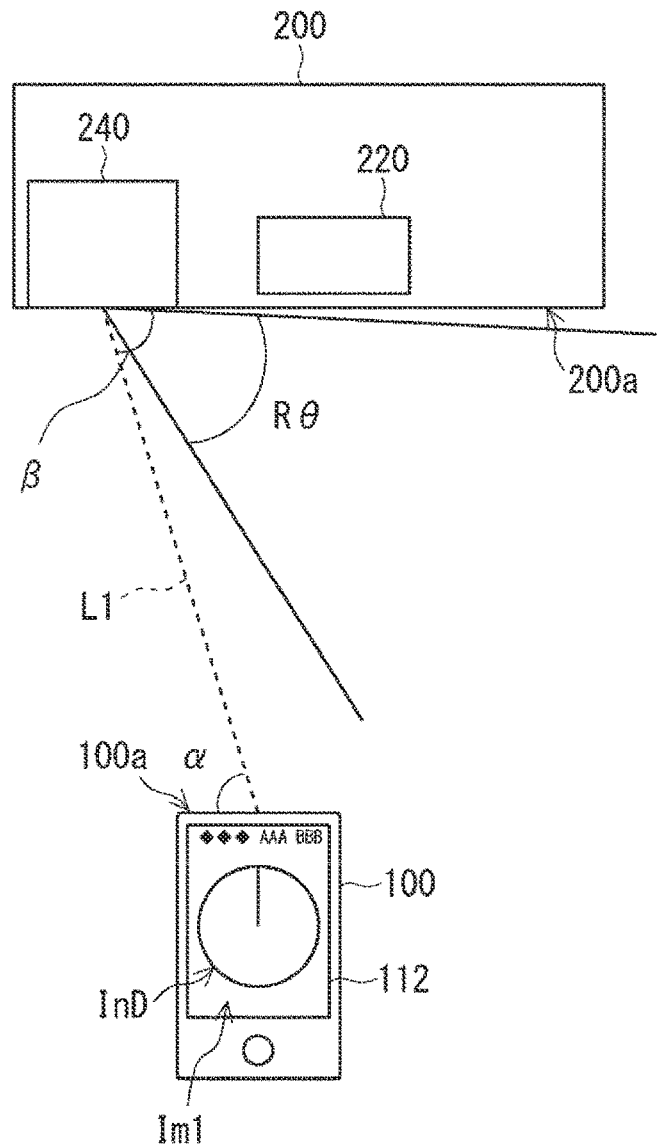
FIG. 7 describes the positional relationship between the electronic instruments and the terminal apparatus according to the first embodiment.
FIG. 8 shows an example of a table according to the first embodiment that associates the model of the electronic instrument with a predetermined angular range.

FIG. 7 describes the positional relationship between any of the electronic instruments 200 and the terminal apparatus 100 according to the first embodiment. FIG. 7 shows the terminal apparatus 100 and any of the electronic instruments 200. The view of the electronic instrument 200 shown in FIG. 7 is a diagrammatic top view of the electronic instrument 200. The electronic instrument 200 includes the operation panel 220, as shown in FIG. 1. In the example shown in FIG. 7, the electronic instrument 200 is provided with a wireless substrate 240 on the left side of the operation panel 220 when viewed from the side facing a front surface 200a of the electronic instrument 200. The position of the wireless substrate 240 in the electronic instrument 200 may vary in accordance with the model of each of the electronic instruments 200.

The wireless substrate 240 is provided with antennas via which radio waves such as BLE beacons and Wi-Fi beacons are transmitted and received. The first direction information produced in the process in S112 can therefore indicate the direction toward the wireless substrate 240 of the electronic instrument 200 with respect to the terminal apparatus 100. The second direction information produced in the process in S12 can indicate the direction toward the terminal apparatus 100 with respect to the wireless substrate 240 of the electronic instrument 200. It is now assumed that the wireless substrate 240 and the terminal apparatus 100 are connected to each other with a line L1, as shown in FIG. 7. For the sake of description, it is further assumed that the plurality of antennas of the terminal apparatus 100 are arranged in parallel to a front surface 100a. Under the assumptions described above, an angle α of the line L1 with respect to the surface 100a of the terminal apparatus 100 corresponds to the direction toward the wireless substrate 240 of the electronic instrument 200 with respect to the terminal apparatus 100. Note that the plurality of antennas of the terminal apparatus 100 are not necessarily arranged in parallel to the surface 100a.

For the sake of description, it is further assumed that the plurality of antennas of the electronic instrument 200 are disposed in parallel to the front surface 200a of the electronic instrument 200. Under the assumptions described above, an angle β of the line L1 with respect to the portion of the surface 200a of the electronic instrument 200 that is shifted from the wireless substrate 240 toward the operation panel 220 corresponds to the direction toward the terminal apparatus 100 with respect to the electronic instrument 200. That is, the angle of the direction toward the terminal apparatus 100 with respect to the portion of the surface 200a of the electronic instrument 200 that is shifted from the position of the wireless substrate 240 toward the operation panel 220 corresponds to the electronic-instrument-side angle β. A predetermined range RO of the angle with respect to the portion of the surface 200a of the electronic instrument 200 that is shifted from the position of the wireless substrate 240 toward the operation panel 220 corresponds to the predetermined angular range described above. Therefore, when the electronic-instrument-side angle β falls within the predetermined angular range Rθ, the result of the evaluation in S14 is YES. In the example shown in FIG. 7, the electronic-instrument-side angle β does not fall within the predetermined angular range Rθ, the result of the evaluation in S14 is NO. A first screen Im1 containing a direction display InD is therefore displayed on the display section 112 of the terminal apparatus 100. Note that the plurality of antennas of the electronic instrument 200 are not necessarily arranged in parallel to the surface 200a.

The predetermined angular range Rθ can be specified as appropriate, for example, in accordance with the position of the wireless substrate 240 (antennas) in the electronic instrument 200 and the relative positional relationship between the wireless substrate 240 and the operation panel 220 in the electronic instrument 200. The predetermined angular range Rθ can therefore be specified as appropriate in accordance with the model of the electronic instrument 200. Information on the model can be contained in any signal transmitted by the electronic instrument 200. For example, the information on the model can be contained in the BLE beacon Bb. For example, the information on the model may be contained in the response packet transmitted by the electronic instrument 200 having established the infrastructure connection. The predetermined angular range Rθ may therefore be determined based on the information on the model of the electronic instrument 200, which is acquired through the short-range wireless communication, such as BLE. That is, in the evaluation in S14, the display control section 140 may determine the predetermined angular range Rθ based on the information on the model of the electronic instrument 200, which is acquired through the short-range wireless communication, such as BLE.

FIG. 8 shows an example of a table according to the first embodiment that associates the model of the electronic instrument 200 with the predetermined angular range. In FIG. 8, the predetermined angular range Rθ ranges from θa1 to θa2 for the model A. The predetermined angular range Rθ ranges from θb1 to θb2 for the model B. The predetermined angular range Rθ ranges from θc1 to θc2 for the model C. The predetermined angular range Rθ ranges from θd1 to θd2 for the model D (electronic instrument 200D). The predetermined angular range Rθ ranges from θe1 to θe2 for the model E.

The terminal apparatus 100 may store in advance the table shown by way of example in FIG. 8. The display control section 140 may then determine the predetermined angular range Rθ based on the acquired model information and the table shown by way of example in FIG. 8.

In FIG. 6, after the processes in S18 and S20, the process procedure may return to S12. In FIG. 6, the process in S14 is followed by the process in S16, but the order is not necessarily employed. The order in which the processes in S14 and S16 are carried out may be reversed. In this case, the display control section 140 may first evaluate whether the distance between the terminal apparatus 100 and the electronic instrument 200 is greater than or equal to the threshold, and when the distance is greater than or equal to the threshold, the display control section 140 may cause the display section 112 to display the first screen. When the distance is not greater than or equal to the threshold, the display control section 140 may evaluate whether the position of the terminal apparatus 100 falls within the predetermined angular range. When the position of the terminal apparatus 100 does not fall within the predetermined angular range, the display control section 140 may cause the display section 112 to display the first screen. On the other hand, when the position of the terminal apparatus 100 falls within the predetermined angular range, the display control section 140 may cause the display section 112 to display the second screen.

In the flowchart shown in FIG. 6, the processes S12 and S14 may be omitted. That is, the process of evaluating whether the position of the terminal apparatus 100 falls within the predetermined angular range is not an essential process. In this case, the display control section 140 may evaluate whether the distance between the terminal apparatus 100 and the electronic instrument 200 is greater than or equal to the threshold, and when the distance is greater than or equal to the threshold, the display control section 140 may cause the display section 112 to display the first screen. On the other hand, when the distance is not greater than or equal to the threshold, the display control section 140 may cause the display section 112 to display the second screen.

Figure 9:
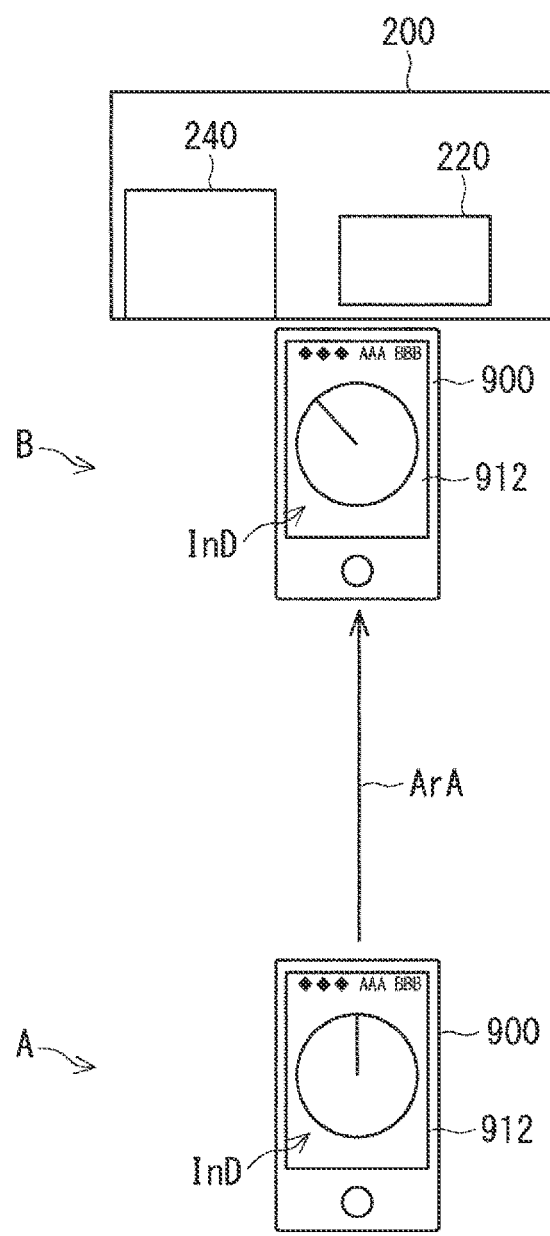
FIG. 9 shows the positional relationship between the terminal apparatus according to Comparative Example and the electronic instrument.

FIG. 9 shows the positional relationship between a terminal apparatus 900 according to Comparative Example and any of the electronic instruments 200. Comparative Example shown in FIG. 9 corresponds to the technology described in JP-A-2021-29012. When the terminal apparatus 900 is sufficiently separate from the electronic instrument 200, as indicated by the arrow A, it can be said that the direction display InD displayed on a display section 912 of the terminal apparatus 900 indicates an approximate direction toward the electronic instrument 200. When the terminal apparatus 900 is sufficiently separate from the electronic instrument 200, there is no problem as long as the display section 912 of the terminal apparatus 900 shows the direction display InD, which indicates the approximate direction toward the electronic instrument 200.

On the other hand, it is assumed that a user who carries the terminal apparatus 900 moves toward the electronic instrument 200, as indicated by the arrow ArA, so that the terminal apparatus 900 is caused to approach the electronic instrument 200 in such a way that the distance therebetween is smaller than or equal to a predetermined distance, as indicated by the arrow B. In this case, the direction display InD displayed on the display section 912 shows the direction toward the wireless substrate 240. It is believed desirable that the direction display InD indicates the direction toward a position on the electronic instrument 200 to which the user pays attention, such as the operation panel 220 or the center position on the electronic instrument 200. When the position of the wireless substrate 240 is separate from the operation panel 220 in the electronic instrument 200, or when the position of the wireless substrate 240 is separate from the center position on the electronic instrument 200, however, the direction indicated by the direction display InD can undesirably deviate from the desired direction. Comparative Example may therefore cause loss of convenience of the user.

In contrast, in the present embodiment, when the distance to the electronic instrument 200 is greater than or equal to the threshold, the display control section 140 is configured to cause the display section 112 to display the first screen containing the direction display InD, which displays the direction toward the electronic instrument 200 with respect to the terminal apparatus 100. When the distance to the electronic instrument 200 is not greater than or equal to the threshold, the display control section 140 is configured to cause the display section 112 to display the second screen different from the first screen. The configuration described above causes the second screen to be displayed when the direction of the direction display InD displayed in the first screen can undesirably deviate from the desired direction described above. The configurations described above can suppress display of the direction display that deviates from the direction toward the desired position on the electronic instrument 200 (central position on electronic instrument 200 or position of operation panel 220, for example). The convenience of the user is therefore improved.

In the present embodiment, the display control section 140 may be configured to acquire the second direction information indicating the direction toward the terminal apparatus 100 with respect to the electronic instrument 200. The display control section 140 may be configured to cause the display section 112 to display the second screen when the distance to the electronic instrument 200 is not greater than or equal to the threshold and the direction toward the terminal apparatus 100 with respect to the electronic instrument 200 based on the second direction information falls within the predetermined angular range. The configurations described above can suppress display of a direction display that deviates from the direction toward the desired position on the electronic instrument 200 when the terminal apparatus 100 falls within the predetermined range at the side facing the front surface of the electronic instrument 200. The convenience of the user is therefore further improved.

In the present embodiment, the display control section 140 may be configured to acquire the second direction information detected by the electronic instrument 200.

Instead, in the present embodiment, the display control section 140 may be configured to acquire the second direction information detected by the terminal apparatus 100 and corresponding to the angle at which the electronic instrument 200 radiates a radio wave. The configuration described above allows acquisition of the second direction information even when the terminal apparatus 100 transmits no radio wave.

In the present embodiment, the predetermined angular range may be determined based on the information on the model of the electronic instrument 200, which is acquired through the short-range wireless communication. The configuration described above allows more reliable acquisition of the second direction information even when the electronic instruments 200 are formed of different models.

Figure 10:
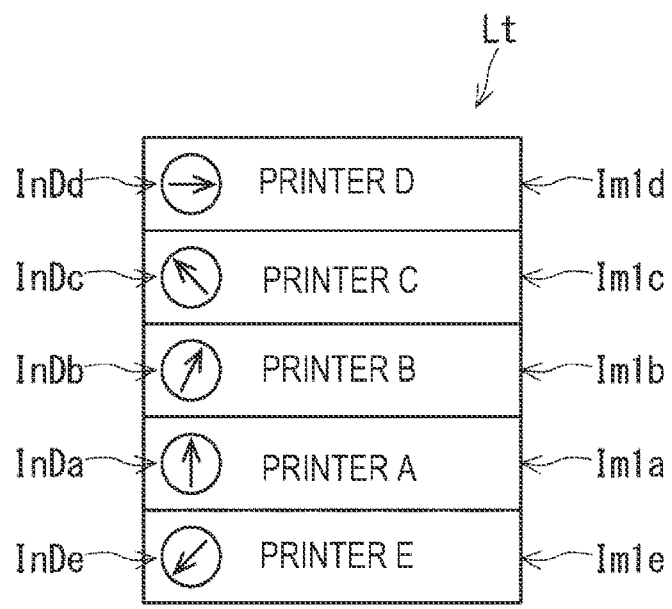
FIG. 10 shows an example of a first or second screen displayed on the terminal apparatus according to the first embodiment.
Figure 11:
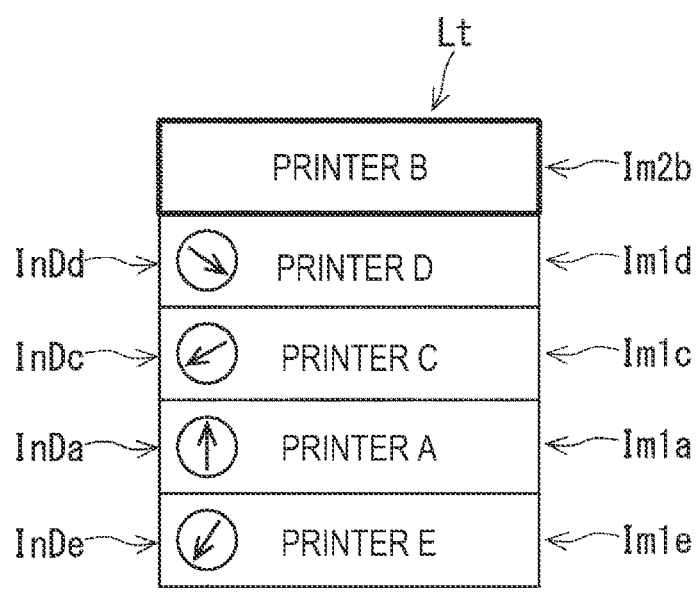
FIG. 11 shows an example of the first or second screen displayed on the terminal apparatus according to the first embodiment.

FIGS. 10 to 18 show examples of the first or second screen displayed on the terminal apparatus 100 according to the first embodiment. FIGS. 10 to 14 show an example of the first or second screen displayed in the process in S120 of the flowchart shown in FIG. 5. FIGS. and 11 show examples of the device list displayed on the terminal apparatus 100 according to the first embodiment. FIGS. 10 and 11 show a device list Lt in a case where the printers A to E (electronic instruments 200A to 200E) have been found. FIGS. 10 and 11 show examples in which the device list Lt shows the direction display relating to each of the printers.

The device list Lt shown by way of example in FIGS. 10 and 11 shows the printers (electronic instruments 200) in ascending order of distance from the terminal apparatus 100. In the example shown in FIG. 10, the distances from the terminal apparatus 100 to the printers increases in the following order: the printer D; the printer C; the printer B; the printer A; and the printer E. In the example shown in FIG. 11, the distances from the terminal apparatus 100 to the printers increases in the following order: the printer B; the printer D; the printer C; the printer A; and the printer E. The order in which the printers are displayed in the device list Lt is not necessarily the ascending order of distance from the terminal apparatus 100. The same holds true for the device list Lt in other figures.

FIG. 10 shows an example in which the device list Lt is displayed only with the first screens. In the example shown in FIG. 10, the terminal apparatus 100 is separate by the predetermined distance or greater from all the found printers A to E. The terminal apparatus 100 does not fall within the predetermined range at the side facing the front surface of each of the found printers A to E.

The device list Lt shown by way of example in FIG. includes the direction displays InD, which indicate the directions toward the printers with respect to the terminal apparatus 100. In the example shown in FIG. 10, in the device list Lt, the printers are each displayed in the form of the first screen Im1 containing the direction display InD. The direction display InD shows, for each of the printers, the direction indicated by the first direction information in the form of the orientation of an arrow.

In the device list Lt shown by way of example in FIG. 10, the printer D is displayed in the form of a first screen Im1*d* containing a direction display InDd, which indicates the direction toward the printer D with respect to the terminal apparatus 100. The direction display InDd indicates that the direction toward the printer D is the right direction with respect to the terminal apparatus 100. In the device list Lt, the printer C is displayed in the form of a first screen Im1*c* containing a direction display InDc, which indicates the direction toward the printer C with respect to the terminal apparatus 100. The direction display InDc indicates that the direction toward the printer C is an obliquely forward left direction with respect to the terminal apparatus 100.

In the device list Lt, the printer B is displayed in the form of a first screen Im1*b* containing a direction display InDb, which indicates the direction toward the printer B with respect to the terminal apparatus 100. The direction display InDb indicates that the direction toward the printer B is an obliquely forward right direction with respect to the terminal apparatus 100. In the device list Lt, the printer A is displayed in the form of a first screen Im1*a* containing a direction display InDa, which indicates the direction toward the printer A with respect to the terminal apparatus 100. The direction display InDa indicates that the direction toward the printer A is the forward direction with respect to the terminal apparatus 100. In the device list Lt, the printer E is displayed in the form of a first screen Im1*e* containing a direction display InDe, which indicates the direction toward the printer E with respect to the terminal apparatus 100. The direction display InDe indicates that the direction toward the printer E is an obliquely rearward left direction with respect to the terminal apparatus 100.

FIG. 11 shows an example in which the device list Lt is displayed with the first and second screens. In the example shown in FIG. 11, the terminal apparatus 100 is located within the predetermined distance from the printer B out of the found printers A to E, and is separate from the other printers by the predetermined distance or greater. Furthermore, out of all the found printers A to E, the terminal apparatus 100 falls within the predetermined range at the side facing the front surface of the printer B but does not fall within the predetermined range at the side facing the front surface of any of the other printers.

In the device list Lt shown by way of example in FIG. 11, the printer D is displayed in the form of the first screen Im1*d* containing the direction display InDd, which indicates the direction toward the printer D with respect to the terminal apparatus 100. The direction display InDd indicates that the direction toward the printer D is the obliquely right rearward direction with respect to the terminal apparatus 100. In the device list Lt, the printer C is displayed in the form of the first screen Im1*c* containing the direction display InDc, which indicates the direction toward the printer C with respect to the terminal apparatus 100. The direction display InDc indicates that the direction toward the printer C is an obliquely rearward left direction with respect to the terminal apparatus 100.

In the device list Lt, the printer A is displayed in the form of the first screen Im1*a* containing the direction display InDa, which indicates the direction toward the printer A with respect to the terminal apparatus 100. The direction display InDa indicates that the printer A is present in front of the terminal apparatus 100. In the device list Lt, the printer E is displayed in the form of the first screen Im1*e* containing the direction display InDe, which indicates the direction toward the printer E with respect to the terminal apparatus 100. The direction display InDe indicates that the printer E is present at an obliquely rearward left side of the terminal apparatus 100.

In contrast, in the device list Lt shown by way of example in FIG. 11, the printer B is displayed in the form of a second screen Im2*b*. The second screen Im2*b* does not contain a direction display indicating the direction toward the printer B with respect to the terminal apparatus 100. The second screen Im2*b* shows the printer B in a form more emphasized than the other displayed devices.

Figure 12:
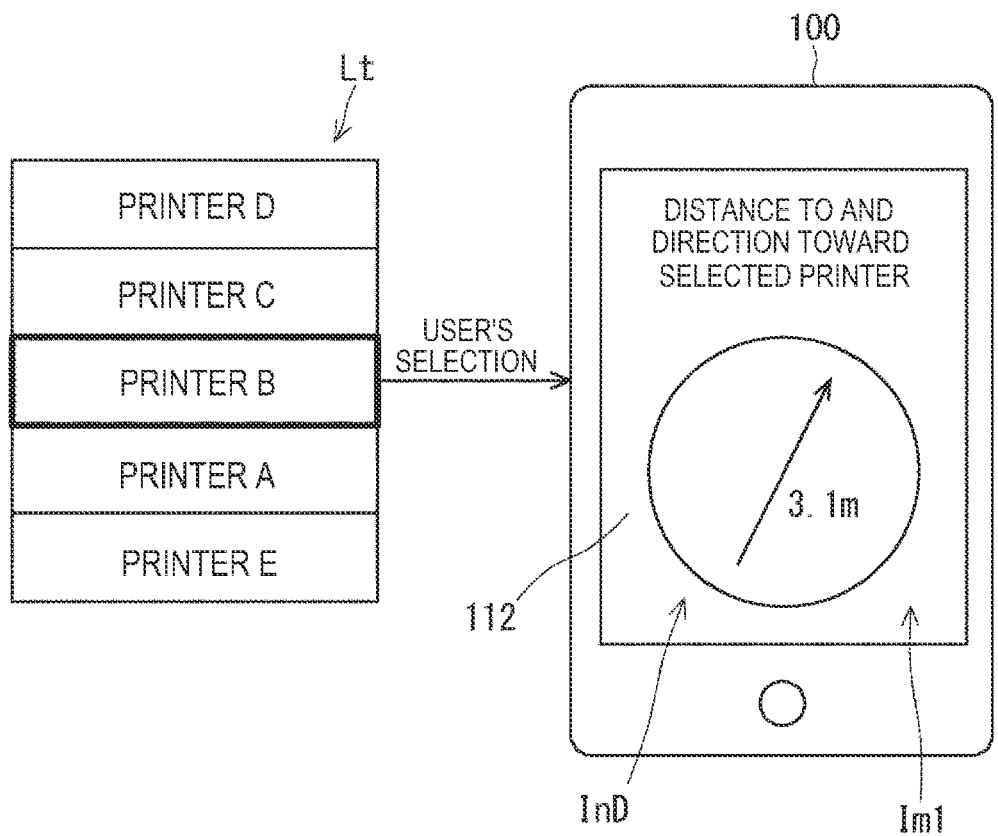
FIG. 12 shows an example of the first or second screen displayed on the terminal apparatus according to the first embodiment.

FIG. 12 shows an example of the selection of a printer by using the device list Lt displayed on the terminal apparatus 100 according to the first embodiment. FIG. 12 shows a device list in the case where the printers A to E (electronic instruments 200A to 200E) have been found. The device list shown by way of example in FIG. 12 shows the printers (electronic instruments 200) in ascending order of distance from the terminal apparatus 100. On the other hand, the device list shown by way of example in FIG. 12 differs from the device list shown by way of examples in FIGS. 10 and 11 in that no direction display is shown. In the example shown in FIG. 12, the distances from the terminal apparatus 100 to the printers increases in the following order: the printer D; the printer C; the printer B; the printer A; and the printer E.

In the example shown in FIG. 12, the user selects the printer B by using the device list displayed on the terminal apparatus 100. The terminal apparatus 100 is separate from the selected printer B by the predetermined distance or greater. The terminal apparatus 100 does not fall within the predetermined range at the side facing the front surface of the selected printer B.

In this case, when the user selects the printer B, the display section 112 of the terminal apparatus 100 displays the first screen Im1 relating to the printer B, as shown by way of example in FIG. 12. The first screen Im1 shown by way of example in FIG. 12 contains the direction display InD indicating the direction toward the printer B with respect to the terminal apparatus 100. The first screen Im1 may further show a distance of "3.1 meters" between the terminal apparatus 100 and the printer B, as in the example shown in FIG. 12. The first screen Im1 may still further show a message of "Distance to and direction toward selected printer", as in the example shown in FIG. 12.

Figure 13:
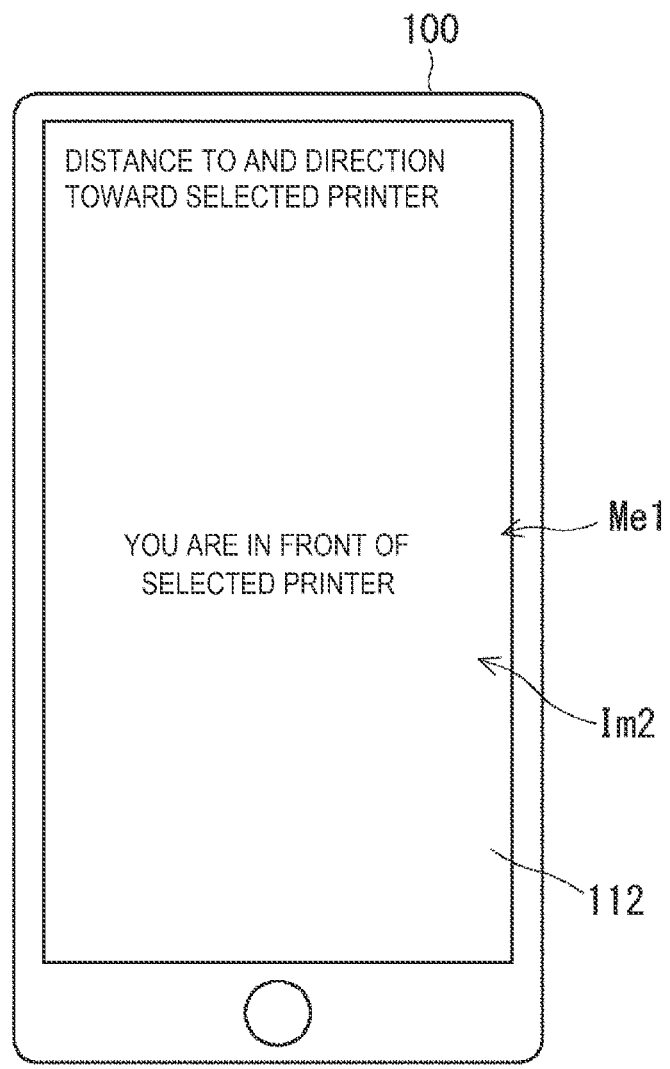
FIG. 13 shows an example of the first or second screen displayed on the terminal apparatus according to the first embodiment.
Figure 14:
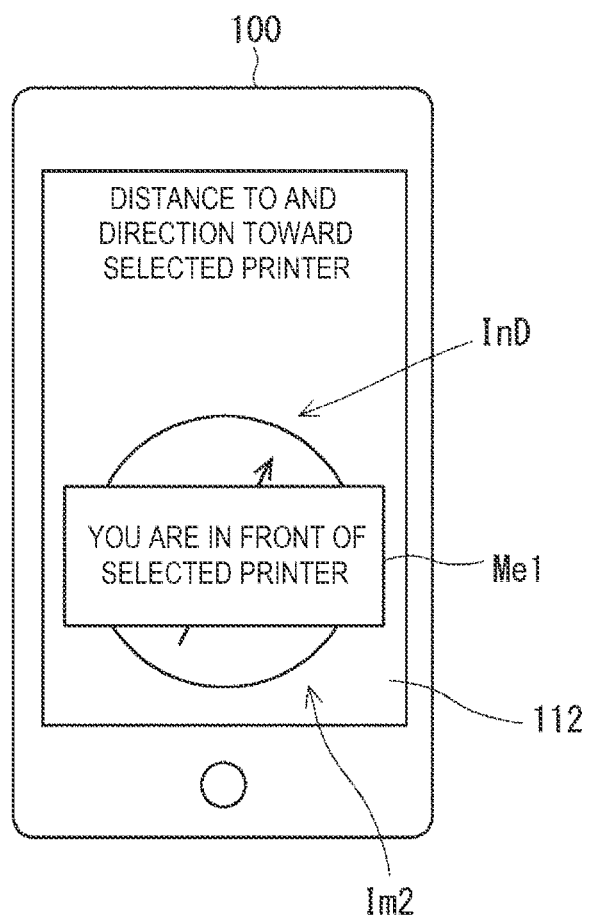
FIG. 14 shows an example of the first or second screen displayed on the terminal apparatus according to the first embodiment.

FIGS. 13 and 14 show examples of a second screen Im2 displayed on the terminal apparatus 100 according to the first embodiment. FIGS. 13 and 14 show a case where the user has selected a printer, for example, by using the device list. The terminal apparatus 100 is located within the predetermined distance from the selected printer. The terminal apparatus 100 further falls within the predetermined range at the side facing the front surface of the selected printer. In this case, the display section 112 of the terminal apparatus 100 displays the second screen Im2 relating to the selected printer, as shown in FIGS. 13 and 14.

In the example shown in FIG. 13, the second screen Im2 contains no direction display InD. The second screen Im2 contains a message Me1 of "You are in front of selected printer.", in the example shown in FIG. 13. The message Me1 is a message indicating that the distance between the terminal apparatus 100 and the printer (electronic instrument 200) is smaller than the threshold. The second screen Im2 containing the message Me1 allows the user to readily understand that the terminal apparatus 100, that is, the user is near the selected printer.

The second screen Im2 contains the message Me1 of "You are in front of selected printer." in the example shown in FIG. 14. In the second screen Im2, the message Me1 is displayed with the message Me1 superimposed on the direction display InD. The direction display InD displayed in the second screen Im2 in FIG. 14 is therefore displayed in a less noticeable form than that displayed in the first screen Im1 in FIG. 12. In other words, the direction display InD displayed in the first screen Im1 in FIG. 12 is displayed in a more noticeable form than that displayed in the second screen Im2 in FIG. 14. The first screen Im1 is therefore a screen in which the direction display InD is displayed in the more noticeable form than that displayed in the second screen Im2. Even the configuration described above can suppress display of the direction display that deviates from the direction toward the desired position on the printer (electronic instrument 200). The convenience of the user is therefore improved.

The second screen Im2 shown by way of example in FIG. 13 contains no direction display InD. It can therefore be said that the first screen Im1 in FIG. 12 displays the direction display InD in the more noticeable form than that displayed in the second screen Im2 in FIG. 13. In other words, the direction display InD is less noticeable in the second screen Im2 in FIG. 13 than in the first screen Im1 in FIG. 12. The second screen Im2 containing no direction display can further suppress display of the direction display that deviates from the direction toward the desired position on the printer (electronic instrument 200).

Figure 15:
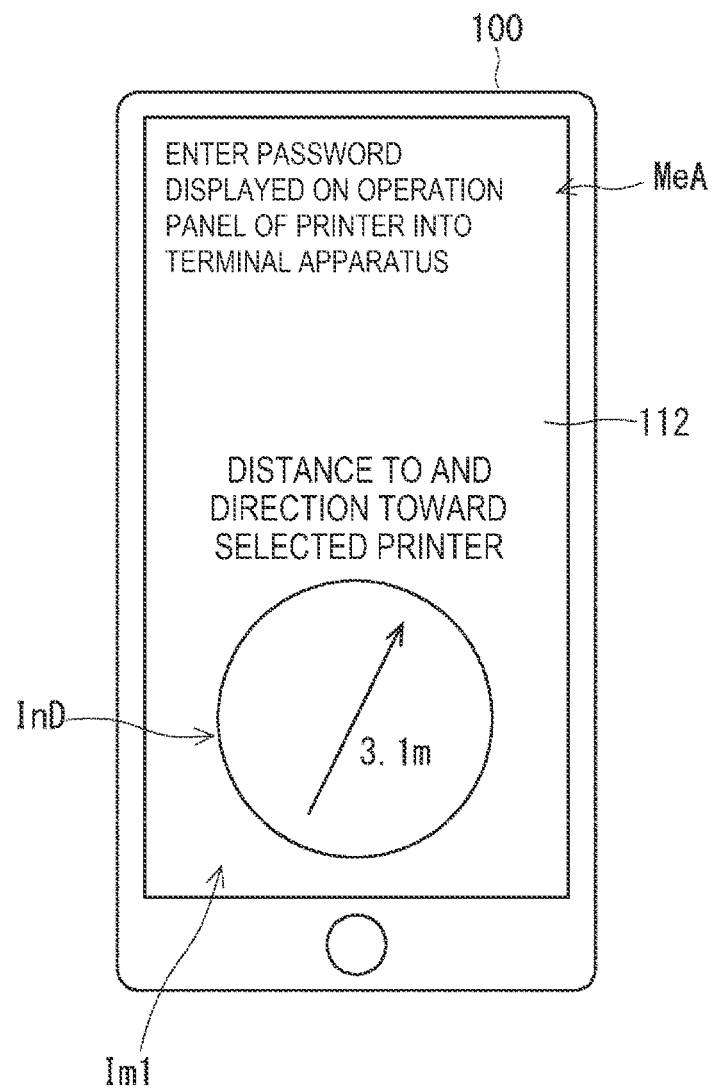
FIG. 15 shows an example of the first or second screen displayed on the terminal apparatus according to the first embodiment.
Figure 16:
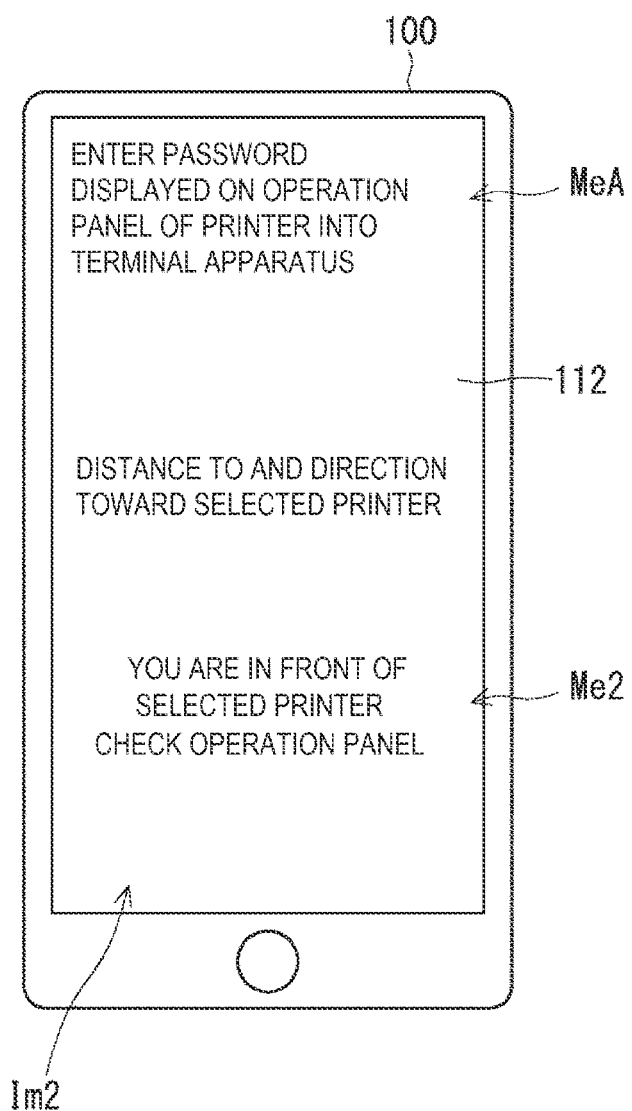
FIG. 16 shows an example of the first or second screen displayed on the terminal apparatus according to the first embodiment.

FIGS. 15 to 16 show examples of the first or second screen displayed in the process in S140 of the flowchart shown in FIG. 5. FIGS. 15 and 16 show examples of the first or second screen displayed on the terminal apparatus 100 when the terminal apparatus 100 establishes the direct connection to the printer (electronic instrument 200).

FIG. 15 shows an example of the first screen Im1 displayed on the terminal apparatus 100 when the terminal apparatus 100 according to the first embodiment establishes the direct connection to the electronic instrument 200, which is a printer. In the example shown in FIG. 15, the terminal apparatus 100 is separate from the selected printer by the predetermined distance or greater. The terminal apparatus 100 further does not fall within the predetermined range at the side facing the front surface of the selected printer.

In this case, the display section 112 of the terminal apparatus 100 displays the first screen Im1 relating to the selected printer, as shown by way of example in FIG. 15. The first screen Im1 shown by way of example in FIG. 15 contains the direction display InD indicating the direction toward the selected printer with respect to the terminal apparatus 100. The first screen Im1 may further show the distance of "3.1 meters" between the terminal apparatus 100 and the printer, as in the example shown in FIG. 15. The first screen Im1 may still further show the message of "Distance to and direction toward selected printer", as in the example shown in FIG. 15. Furthermore, the first screen Im1 may show a message MeA of "Enter password displayed on operation panel of printer into terminal apparatus", as in the example shown in FIG. 15. The message MeA is a message that prompts the user to enter the password displayed on the operation panel 220 of the printer (electronic instrument 200) into the terminal apparatus 100.

FIG. 16 shows an example of the second screen Im2 displayed on the terminal apparatus 100 when the terminal apparatus 100 according to the first embodiment establishes the direct connection to the electronic instrument 200. In the example shown in FIG. 16, the terminal apparatus 100 is located within the predetermined distance from the selected printer. The terminal apparatus 100 further falls within the predetermined range at the side facing the front surface of the selected printer.

In this case, the display section 112 of the terminal apparatus 100 displays the second screen Im2 relating to the selected printer, as shown by way of example in FIG. 16. In the example shown in FIG. 16, the second screen Im2 contains no direction display InD. In the example shown in FIG. 16, the second screen Im2 contains a message Me2 of "You are in front of printer. Check operation panel". The message Me2 is a message indicating that the distance between the terminal apparatus 100 and the printer (electronic instrument 200) is smaller than the threshold. The second screen Im2 containing the message Me2 allows the user to readily understand that the terminal apparatus 100 is near the selected printer. The second screen Im2 may display the message Me2 superimposed on the direction display InD, as in the example shown in FIG. 14. The second screen Im2 may further contain, as shown by way of example in FIG. 16, the message MeA shown in the first screen Im1 shown by way of example in FIG. 15.

Figure 17:
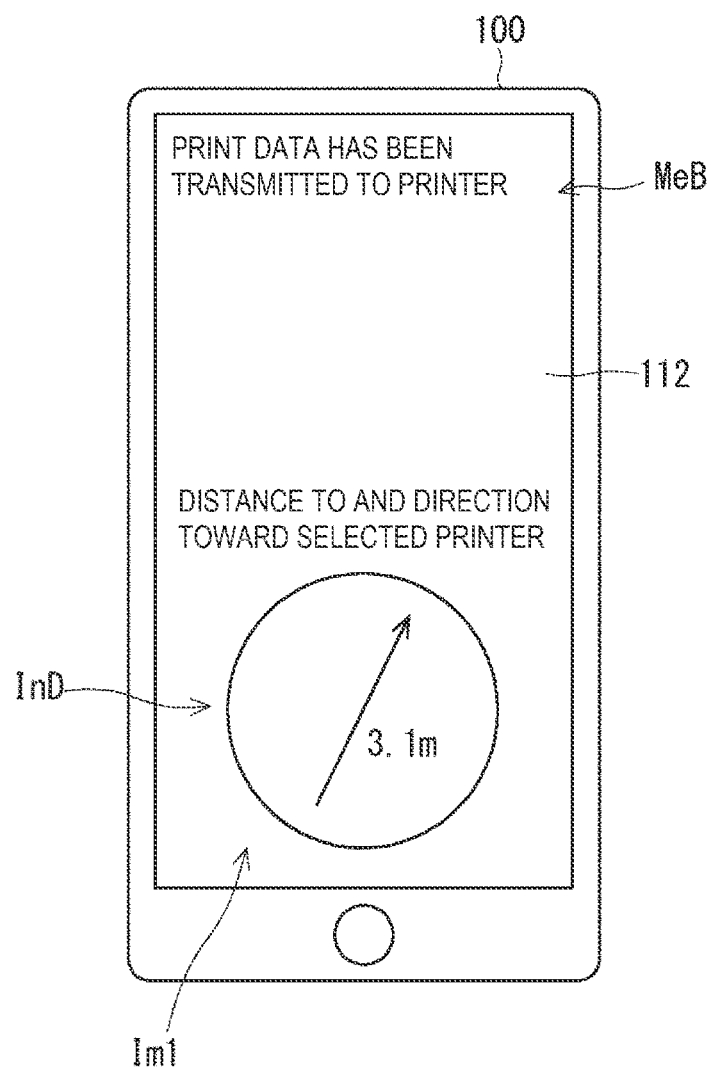
FIG. 17 shows an example of the first or second screen displayed on the terminal apparatus according to the first embodiment.
Figure 18:
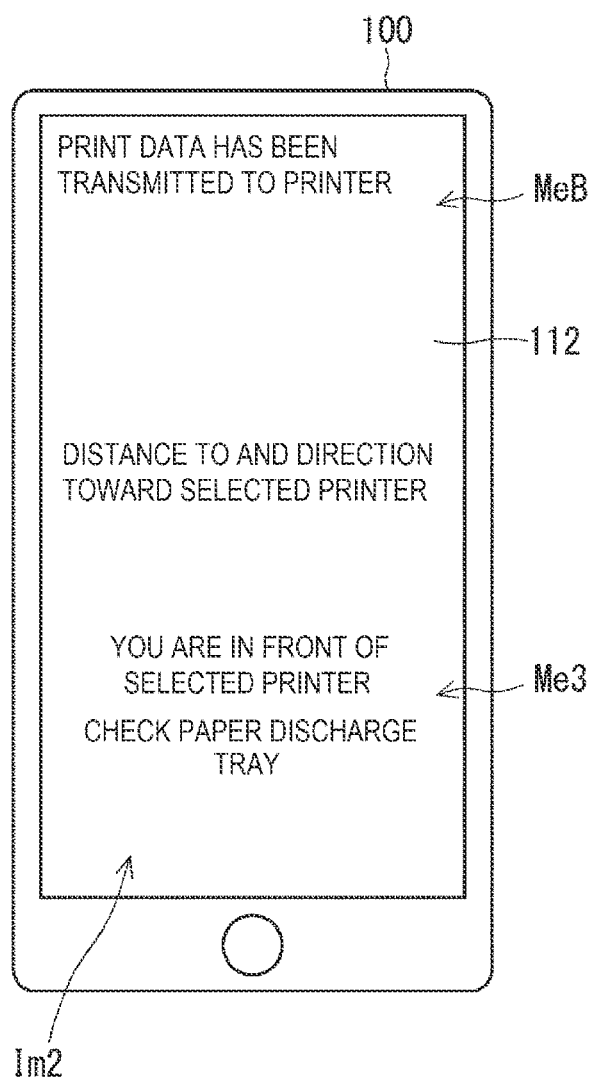
FIG. 18 shows an example of the first or second screen displayed on the terminal apparatus according to the first embodiment.

FIGS. 17 to 18 show examples of the first or second screen displayed in the process in S170 of the flowchart shown in FIG. 5. FIGS. 17 and 18 show examples of the first or second screen displayed on the terminal apparatus 100 when the terminal apparatus 100 transmits print data to the printer (electronic instrument 200).

FIG. 17 shows an example of the first screen Im1 displayed on the terminal apparatus 100 when the terminal apparatus 100 according to the first embodiment transmits print data to the electronic instrument 200, which is a printer. In the example shown in FIG. 17, the terminal apparatus 100 is separate from the selected printer by the predetermined distance or greater. The terminal apparatus 100 further does not fall within the predetermined range at the side facing the front surface of the selected printer.

In this case, the display section 112 of the terminal apparatus 100 displays the first screen Im1 relating to the selected printer, as shown by way of example in FIG. 17. The first screen Im1 shown by way of example in FIG. 17 contains the direction display InD indicating the direction toward the selected printer with respect to the terminal apparatus 100. The first screen Im1 may further show the distance of "3.1 meters" between the terminal apparatus 100 and the printer, as in the example shown in FIG. 17. The first screen Im1 may still further show the message of "Distance to and direction toward selected printer", as in the example shown in FIG. 17. Furthermore, the first screen Im1 may show a message MeB of "Print data has been transmitted to printer", as in the example shown in FIG. 17. The message MeB is a message indicating that the terminal apparatus 100 has transmitted print data to the selected printer (electronic instrument 200).

FIG. 18 shows an example of the second screen Im2 displayed on the terminal apparatus 100 when the terminal apparatus 100 according to the first embodiment transmits print data to the electronic instrument 200, which is a printer. In the example shown in FIG. 18, the terminal apparatus 100 is located within the predetermined distance from the selected printer. The terminal apparatus 100 further falls within the predetermined range at the side facing the front surface of the selected printer.

In this case, the display section 112 of the terminal apparatus 100 displays the second screen Im2 relating to the selected printer, as shown by way of example in FIG. 18. In the example shown in FIG. 18, the second screen Im2 contains no direction display InD. In the example shown in FIG. 18, the second screen Im2 contains a message Me3 of "You are in front of printer. Check paper discharge tray". The message Me3 is a message indicating that the distance between the terminal apparatus 100 and the printer (electronic instrument 200) is smaller than the threshold. The second screen Im2 containing the message Me3 allows the user to readily understand that the terminal apparatus 100 is near the selected printer. The second screen Im2 may display the message Me3 superimposed on the direction display InD, as in the example shown in FIG. 14. The second screen Im2 may further contain, as shown by way of example in FIG. 18, the message MeB shown in the first screen Im1 shown by way of example in FIG. 17.

Variations

The present disclosure is not limited to the embodiment described above, and may be modified as appropriate without departing from the intent of the present disclosure. For example, the communication system 1 shown in FIG. 2 includes five electronic instruments 200, but the communication system 1 includes any number of electronic instruments 200.

The order in which the processes in each of the flowcharts described above are carried out can be changed as appropriate. One or more of the processes in the flowcharts described above can be omitted. For example, in the flowchart shown in FIG. 5, the order in which the processes S102 and S104 are carried out may be reversed. Instead, the processes in S102 and S104 may be carried out in parallel to each other. The order in which the processes in S110 and S112 are carried out may be reversed. Instead, the processes in S110 and S112 may be carried out in parallel to each other. The processes in S160 to S170 may be omitted. The processes in S130 to S152 may be omitted.

In the example described above, the programs each include a group of instructions (or software codes) that, when loaded into a computer, cause the computer to perform one or more of the functions described in the embodiment. The programs may be stored on a non-transitory computer readable medium or a tangible storage medium. The computer readable medium or the tangible storage medium is not limited to a specific medium and may include a random-access memory (RAM), a read-only memory (ROM), a flash memory, a solid-state drive (SSD), or a memory based on any other memory technology, a CD-ROM, a digital versatile disk (DVD), a Blu-ray (registered trademark) disk, or any other optical disk storage, a magnetic cassette, a magnetic tape, a magnetic disk storage, or any other magnetic storage device. The program may be transmitted on a transitory computer readable medium or a communication medium. The transitory computer readable medium or the communication medium is not limited to a specific medium and may include an electrical, optical, or acoustic propagation signal, or a propagation signal in any other form.

What is claimed is:

1. A terminal apparatus comprising:
a distance information acquisition section that acquires distance information representing a distance between the terminal apparatus and an electronic instrument through short-range wireless communication with the electronic instrument;
a direction information acquisition section that acquires first direction information representing a direction toward the electronic instrument with respect to the terminal apparatus through the short-range wireless communication with the electronic instrument; and
a display control section that controls a display on a display section,
wherein when the distance to the electronic instrument based on the distance information is greater than or equal to a threshold specified in advance, the display control section causes the display section to display a first screen containing a direction display that displays the direction toward the electronic instrument with respect to the terminal apparatus based on the acquired first direction information, and
when the distance to the electronic instrument is not greater than or equal to the threshold, the display control section causes the display section to display a second screen different from the first screen.

2. The terminal apparatus according to claim 1,
wherein the first screen is a screen in which the direction display is displayed in a more noticeable form than in the second screen.

3. The terminal apparatus according to claim 2,
wherein the second screen is a screen that does not contain the direction display.

4. The terminal apparatus according to claim 1,
wherein the second screen contains a message indicating that the distance to the electronic instrument is smaller than the threshold.

5. The terminal apparatus according to claim 1,
wherein the display control section
acquires second direction information indicating a direction toward the terminal apparatus with respect to the electronic instrument, and
causes the display section to display the second screen when the distance to the electronic instrument is not greater than or equal to the threshold and the direction toward the terminal apparatus with respect to the electronic instrument based on the second direction information falls within a predetermined angular range.

6. The terminal apparatus according to claim 5,
wherein the display control section acquires the second direction information detected by the electronic instrument.

7. The terminal apparatus according to claim 5,
wherein the display control section acquires the second direction information detected by the terminal apparatus and corresponding to an angle at which the electronic instrument radiates a radio wave.

8. The terminal apparatus according to claim 5,
wherein the predetermined angular range is determined based on information on a model of the electronic instrument that is acquired through the short-range wireless communication.

9. A display control method comprising:
acquiring distance information representing a distance between a terminal apparatus and an electronic instrument through short-range wireless communication with the electronic instrument;
acquiring first direction information representing a direction toward the electronic instrument with respect to the terminal apparatus through the short-range wireless communication with the electronic instrument;
causing a display section of the terminal apparatus to display a first screen containing a direction display that displays the direction toward the electronic instrument with respect to the terminal apparatus based on the acquired first direction information when the distance to the electronic instrument based on the distance information is greater than or equal to a threshold specified in advance; and
causing the display section to display a second screen different from the first screen when the distance to the electronic instrument is not greater than or equal to the threshold.

10. A non-transitory computer storage device having stored thereon computer executable instructions that, when executed by a processor, cause a computer to perform the following:
acquire distance information representing a distance between a terminal apparatus and an electronic instrument through short-range wireless communication with the electronic instrument;
acquire first direction information representing a direction toward the electronic instrument with respect to the terminal apparatus through the short-range wireless communication with the electronic instrument;
cause a display section of the terminal apparatus to display a first screen containing a direction display that displays the direction toward the electronic instrument with respect to the terminal apparatus based on the acquired first direction information when the distance to the electronic instrument based on the distance information is greater than or equal to a threshold specified in advance; and
cause the display section to display a second screen different from the first screen when the distance to the electronic instrument is not greater than or equal to the threshold.

* * * * *